(12) United States Patent
Zhou et al.

(10) Patent No.: US 7,478,979 B2
(45) Date of Patent: Jan. 20, 2009

(54) ROTATABLE CHUCK

(75) Inventors: Jin Lin Zhou, Wuhan (CN); Xian Guo Zhao, Changde (CN); Chin Hung Lam, Shatin (HK); Zhi Qin Cui, Henan Province (CN); Koon For Chung, Sai Kung (HK)

(73) Assignee: Eastway Fair Company Limited, Tortola (VG)

( * ) Notice: Subject to any disclaimer, the term of this patent is extended or adjusted under 35 U.S.C. 154(b) by 445 days.

(21) Appl. No.: 11/116,127

(22) Filed: Apr. 27, 2005

(65) Prior Publication Data

US 2006/0244223 A1 Nov. 2, 2006

(51) Int. Cl.
*B23B 31/163* (2006.01)

(52) U.S. Cl. .................. 408/240; 279/62; 279/134; 279/140

(58) Field of Classification Search .......... 279/60–62, 279/66, 134, 140; 408/240; *B23B 31/163*
See application file for complete search history.

(56) References Cited

U.S. PATENT DOCUMENTS

| | | | |
|---|---|---|---|
| 2,684,856 A | 7/1954 | Stoner | 279/61 |
| 3,834,252 A * | 9/1974 | Abell et al. | 81/475 |
| 4,277,074 A * | 7/1981 | Kilberis | 279/60 |
| 4,317,578 A | 3/1982 | Welch | 279/60 |
| 4,323,324 A | 4/1982 | Eberhardt | 408/124 |
| 4,395,170 A | 7/1983 | Clarey | 408/241 |
| 4,498,682 A | 2/1985 | Glore | 279/1 K |
| 4,526,497 A * | 7/1985 | Hatfield | 408/240 |
| 4,669,932 A * | 6/1987 | Hartley | 408/239 R |
| 4,682,918 A | 7/1987 | Palm | 408/241 |
| 4,840,387 A | 6/1989 | McCarthy | 279/1 |
| 4,848,779 A | 7/1989 | Wheeler et al. | 279/60 |
| 4,915,555 A | 4/1990 | Smothers | 279/60 |
| 4,951,955 A | 8/1990 | Sakamaki | 279/62 |
| 5,195,760 A | 3/1993 | Wheeler | 279/60 |
| 5,197,749 A * | 3/1993 | Moore et al. | 279/147 |
| 5,232,230 A | 8/1993 | Lin | 279/62 |
| 5,348,318 A | 9/1994 | Steadings et al. | 279/62 |
| 5,407,215 A | 4/1995 | Yang | 279/64 |
| 5,908,076 A * | 6/1999 | Marcengill et al. | 173/93 |
| 5,957,469 A | 9/1999 | Miles et al. | 279/62 |
| 5,988,653 A | 11/1999 | Kuo | 279/62 |
| 5,992,859 A | 11/1999 | Lin | 279/62 |
| 6,045,303 A | 4/2000 | Chung | 408/124 |
| 6,073,939 A | 6/2000 | Steadings et al. | 279/62 |
| 6,179,301 B1 | 1/2001 | Steadings et al. | 279/62 |

(Continued)

*Primary Examiner*—David P Bryant
*Assistant Examiner*—Eric A Gates
(74) *Attorney, Agent, or Firm*—Michael Best & Friedrich LLP

(57) ABSTRACT

A chuck is provided with a body, a plurality of jaws and an adjustment ring. The adjustment ring is threadably engaged with the jaws. When the adjustment ring is rotated in one direction, the jaws tighten by moving closer to each other. When the adjustment ring is rotated in the opposite direction, the jaws loosen by moving away from each other. An impact member is also provided for engagement with the adjustment ring. When the drive shaft of the power tool is rotated, the adjustment ring impacts against the impact member. As a result, the adjustment ring and the body of the chuck rotate relative to each other causing the jaws of the chuck to loosen or tighten depending on the direction the drive shaft is rotating.

25 Claims, 17 Drawing Sheets

U.S. PATENT DOCUMENTS

| | | | |
|---|---|---|---|
| 6,182,978 B1 | 2/2001 | Hsueh | 279/62 |
| 6,196,554 B1 | 3/2001 | Gaddis et al. | 279/63 |
| 6,241,260 B1 | 6/2001 | Judge et al. | 279/64 |
| 6,247,706 B1 | 6/2001 | Kuo | 279/62 |
| 6,257,596 B1 | 7/2001 | Yang | 279/62 |
| 6,390,481 B1 * | 5/2002 | Nakamuro | 279/62 |
| 6,435,521 B2 | 8/2002 | Steadings et al. | 279/62 |
| 6,488,286 B2 | 12/2002 | Yaksich | 279/62 |
| 6,488,287 B2 | 12/2002 | Gaddis et al. | 279/63 |
| 6,513,604 B2 * | 2/2003 | Hanke | 173/48 |
| 6,517,295 B2 | 2/2003 | Lin | 408/16 |
| 6,729,812 B2 | 5/2004 | Yaksich et al. | 408/240 |
| 6,832,764 B2 | 12/2004 | Steadings et al. | 279/62 |
| 6,834,864 B2 | 12/2004 | Girardeau | 279/60 |
| 6,843,484 B2 | 1/2005 | Schroeder | 279/60 |
| 6,843,485 B2 | 1/2005 | Sakamaki et al. | 279/62 |
| 6,860,488 B2 | 3/2005 | Mack | 279/62 |
| 7,008,151 B2 | 3/2006 | Yaksich et al. | 408/240 |
| 7,018,146 B2 | 3/2006 | Barton et al. | 408/240 |
| 2004/0251641 A1 | 12/2004 | Hoffmann et al. | 279/62 |
| 2005/0023774 A1 | 2/2005 | Mack | 279/60 |

* cited by examiner

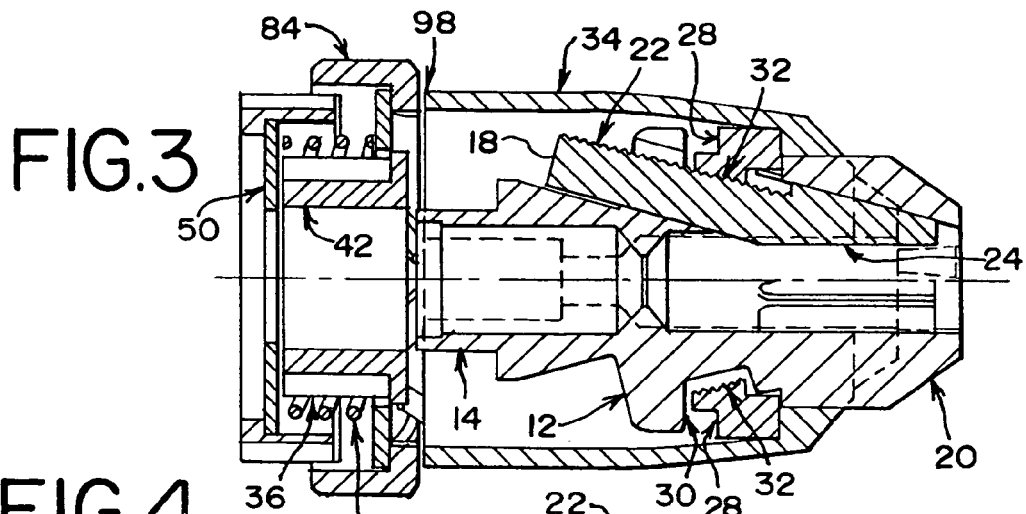
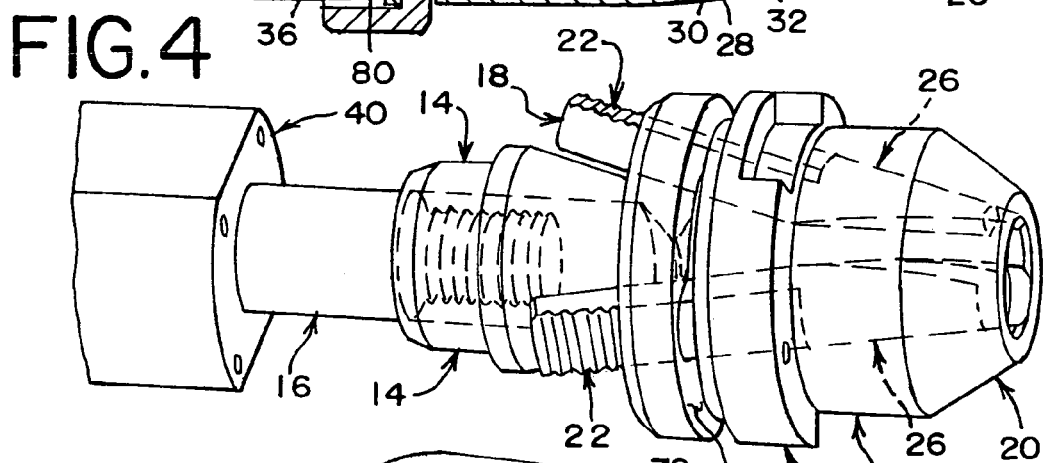
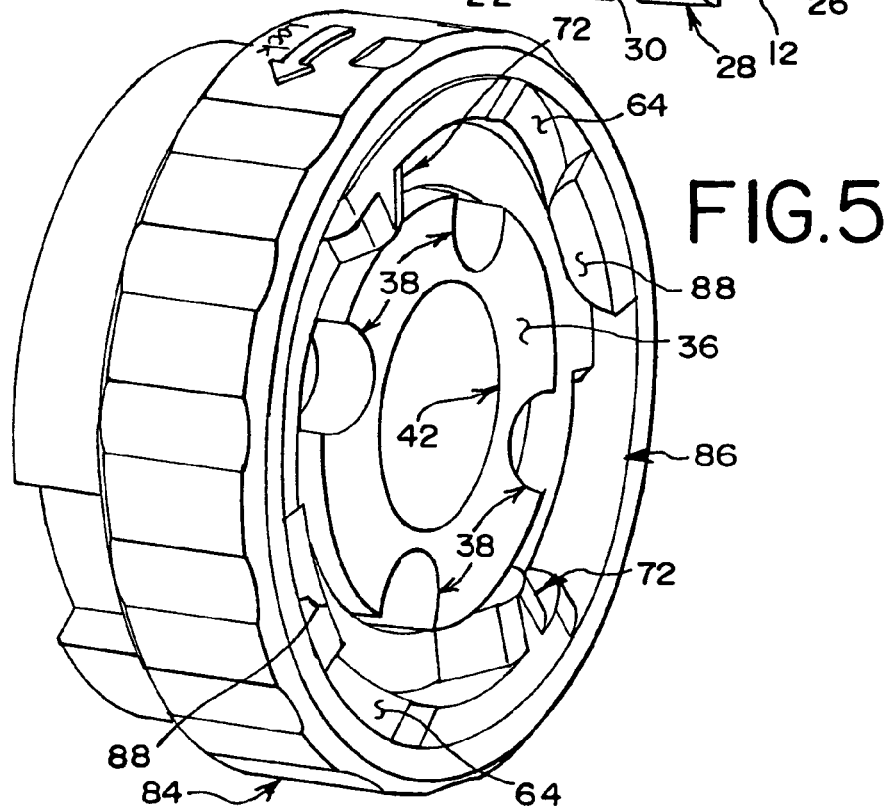

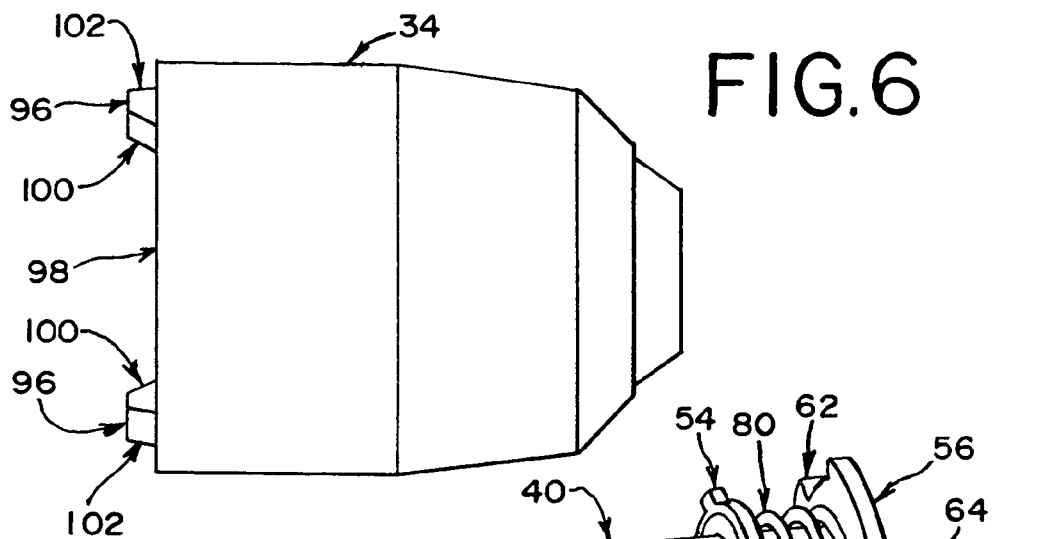
FIG. 6
FIG. 7
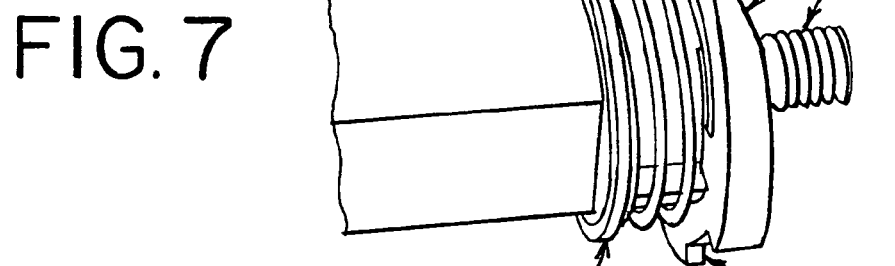
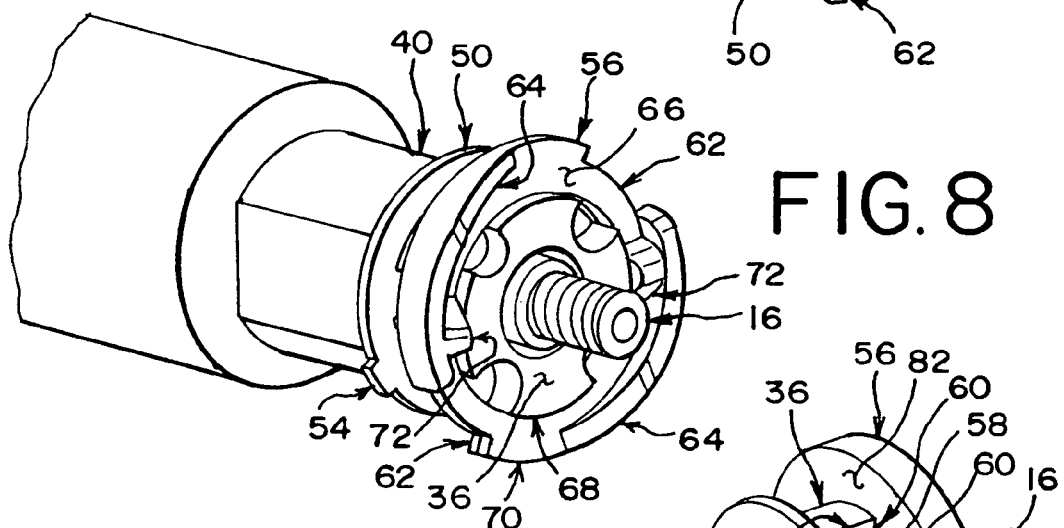
FIG. 8
FIG. 9
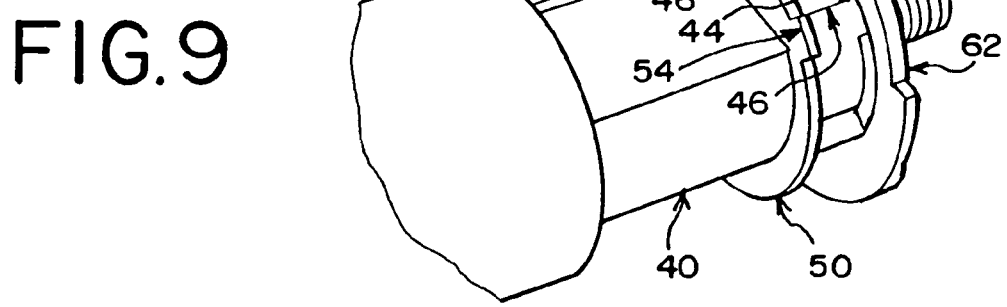

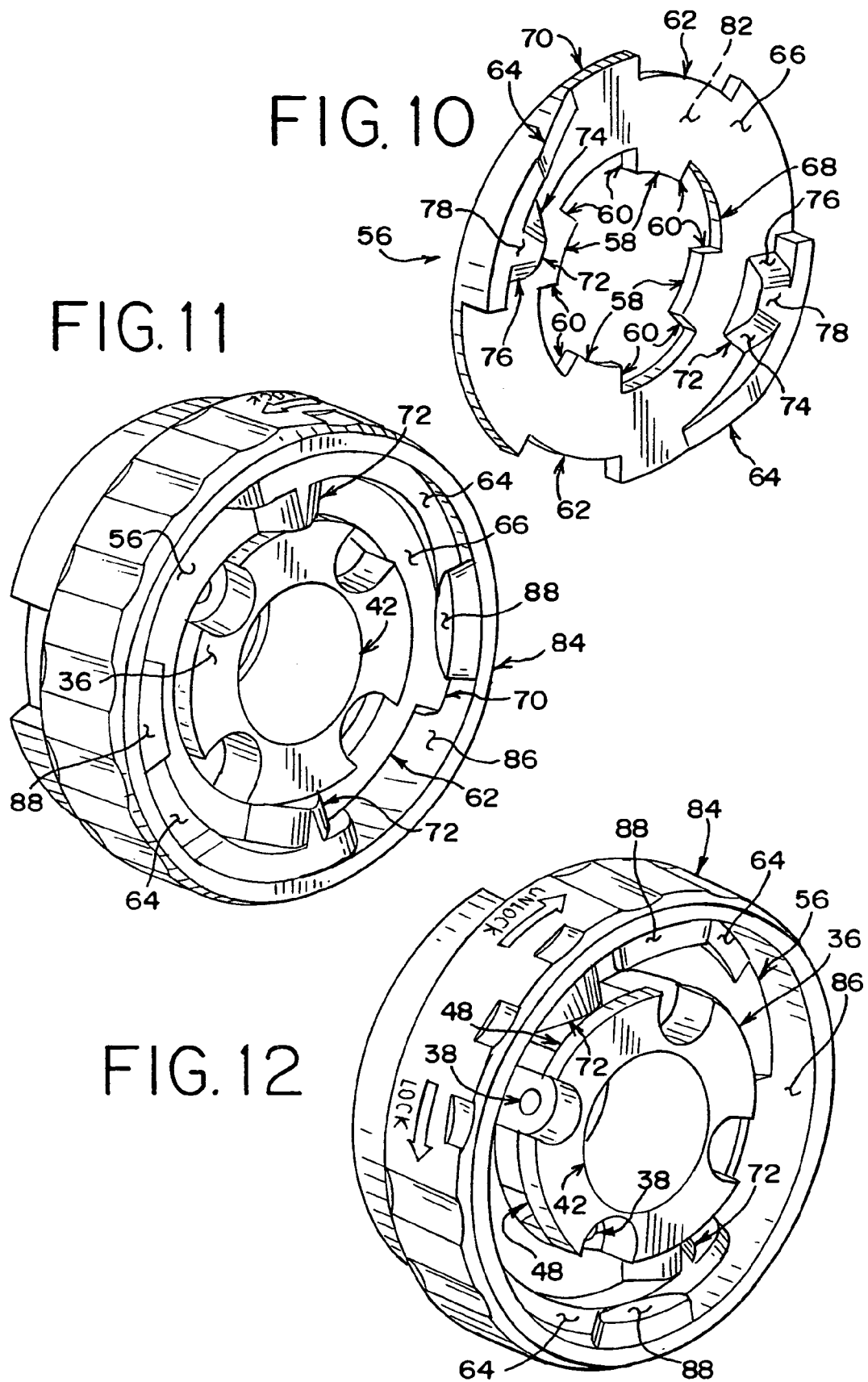

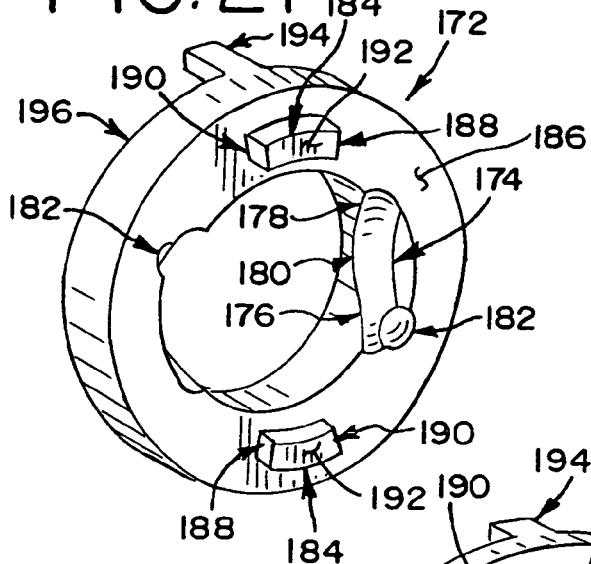
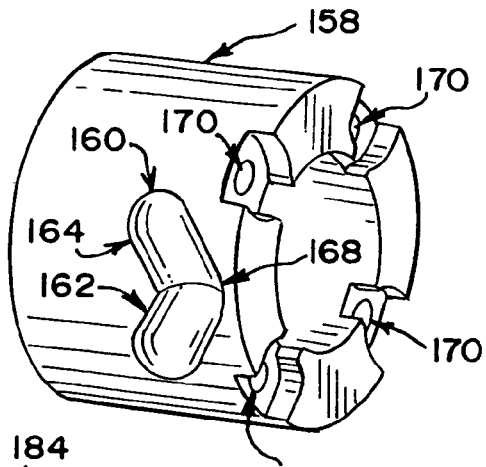
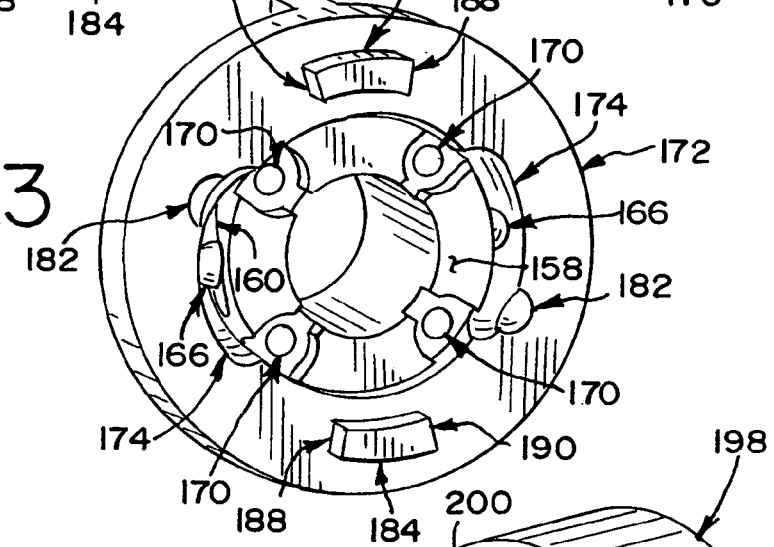
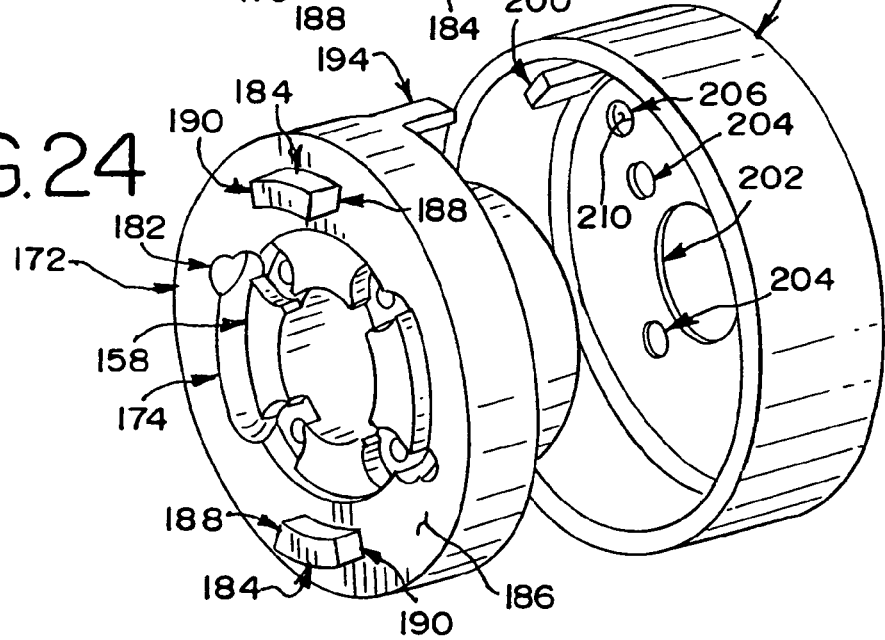

ROTATABLE CHUCK

BACKGROUND

The present invention relates generally to chucks and more particularly to a chuck that may be locked or unlocked by rotating the drive shaft of a power tool.

Chucks are well known and are used in many applications. In general, a chuck is connected to the drive shaft of a power tool. One common example of the type of power tool that a chuck may be used on is an electric drill. However, chucks are also used on numerous other tools, such as screw drivers, nut drivers and grinders. Moreover, power tools may be powered by pneumatics, electricity, manual power or by other power sources. Chucks are generally used to grip the shaft of various work tools so that the work tool rotates with the drive shaft of the power tool. Typical types of work tools that may be used with a chuck include drill bits, screwdriver bits and grinding disks or stones.

A wide variety of chucks have been developed. The most common type of chuck that is employed uses three jaws to grip the shaft of a work tool. These types of chucks are able to securely grip shafts with both round and polygonal cross-sections. Typically, the jaws move towards each other in a smaller diametrical relationship as the chuck is tightened and move away from each other in a larger diametrical relationship as the chuck is loosened. Most chucks are designed so that the jaws have a relatively large range of movement. This allows a single chuck to grip many different work tools with different sized shafts.

Typically, chucks also have an adjustment mechanism that is used to tighten and loosen the jaws. Conventional adjustment mechanisms include an adjustment ring that is threaded to the jaws. Thus, when the adjustment ring is rotated, the threaded engagement between the adjustment ring and the jaws causes the jaws to move toward each other or away from each other depending on the direction the adjustment ring is rotated. Commonly, an outer sleeve that the user may operate by hand is provided which is fixedly attached to the adjustment ring. As a result, when the user rotates the outer sleeve in one direction, the jaws move towards each other in a tightening direction. Likewise, when the user rotates the outer sleeve in the opposite direction, the jaws move away from each other in a loosening direction. Other types of engagement structures may also be used. For example, some chucks use a key to rotate a sleeve that is fixedly attached to the adjustment ring. Typically in these chucks, the key engages a ring gear on the sleeve while being radially fixed to the body of the chuck. As a result, the sleeve rotates and threadably moves the jaws as the user rotates the key, thereby providing the user with increased leverage.

In general, however, most chucks that are commercially sold must be manually operated when tightening and loosening the jaws. This may make the use of a chuck time-consuming, since tightening and loosening often involves rotating the adjustment ring numerous times until the jaws are sufficiently tight against the work tool shaft or sufficiently loose to allow the work tool to be removed from the chuck. This may be a particular disadvantage in operations where a user is likely to use several different work tools during a job and may need to change work tools repeatedly. For example, this may be a problem in drilling and screwing jobs where a user needs to drill a number of pilot holes and then drive screws into the pilot holes. This may require numerous work tool changes between drill bits and driver bits during the course of the job. Because many conventional chucks must be manually operated, the time required to finish a job may be longer than desired and the user may tire before the job is done.

Another problem with manually operated chucks is that the user may sometimes fail to fully tighten the chuck. This may cause the jaws to lose their grip on the work tool when the power tool is operated. Usually, this results in the power tool and the chuck spinning around the shaft of the work tool without transferring rotational torque. This can be particularly annoying and inconvenient to a user, especially in the middle of a long job where the user has had to manually change a work tool numerous times. Sometimes a user may also have difficulty loosening a chuck to remove work tools. This may occur when the user overtightens the chuck or may occur due to unintentional tightening during use. This can also be frustrating and may increase the amount of time needed to finish a project.

BRIEF SUMMARY

Chuck embodiments are described that may be used to automatically tighten or loosen the jaws of a chuck in response to rotation of a power tool drive shaft. Preferably, the chucks have a body, a plurality of jaws and an adjustment ring. The adjustment ring may be threadably engaged with the jaws. When the adjustment ring is rotated in one direction, the jaws tighten by moving closer to each other. When the adjustment ring is rotated in the opposite direction, the jaws loosen by moving away from each other. An impact member is engaged with the adjustment ring. The impact member is rotatably limited and may be disengaged from the adjustment ring. When the drive shaft of the power tool is rotated, the adjustment ring impacts against the impact member. As a result, the adjustment ring and the body of the chuck rotate relative to each other causing the jaws of the chuck to loosen or tighten depending on the direction the drive shaft is rotating. Additional details and advantages are described below.

BRIEF DESCRIPTION OF SEVERAL VIEWS OF THE DRAWINGS

The invention may be more fully understood by reading the following description in conjunction with the drawings, in which:

FIG. 3 is a cross-sectional view of the chuck;

FIG. 4 is a perspective view of the body of the chuck connected to the drive shaft of a power tool;

FIG. 5 is a perspective view of the locking sleeve, impact member and joint member of the chuck;

FIG. 6 is a side elevational view of the outer sleeve of the chuck;

FIG. 7 is a perspective view of the washer, spring, impact member and joint member of the chuck connected to the frame of the power tool;

FIG. 8 is a forward perspective view of the impact member, joint member and washer connected to the frame of the power tool;

FIG. 9 is a rearward perspective view of the impact member, joint member and washer connected to the frame of the power tool;

FIG. 10 is a perspective view of the impact member of the chuck;

FIG. 11 is a forward perspective view of the locking sleeve, impact member and joint member of the chuck, showing the locking sleeve unlocked;

FIG. 12 is a forward perspective view of the locking sleeve, impact member and joint member of the chuck, showing the locking sleeve locked;

FIG. 21 is a perspective view of the impact member of the chuck;

FIG. 22 is a perspective view of the joint member of the chuck;

FIG. 23 is a forward perspective view of the impact member, joint member and balls of the chuck in an assembly;

FIG. 24 is an exploded perspective view of the impact member, joint member, locking sleeve and washer of the chuck;

DETAILED DESCRIPTION

Figure 1:
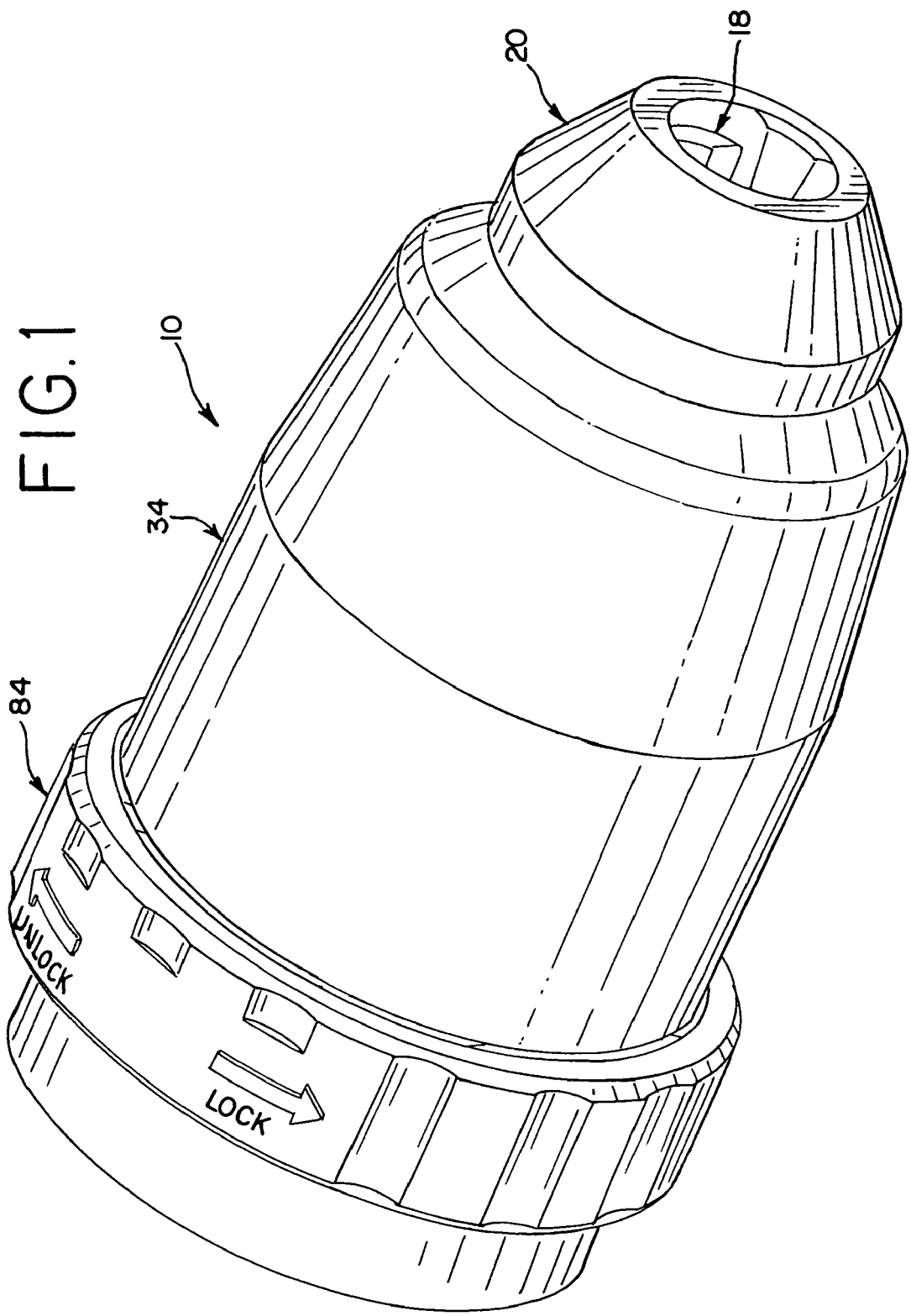
FIG. 1 is a perspective view of one embodiment of a chuck.
Figure 2:
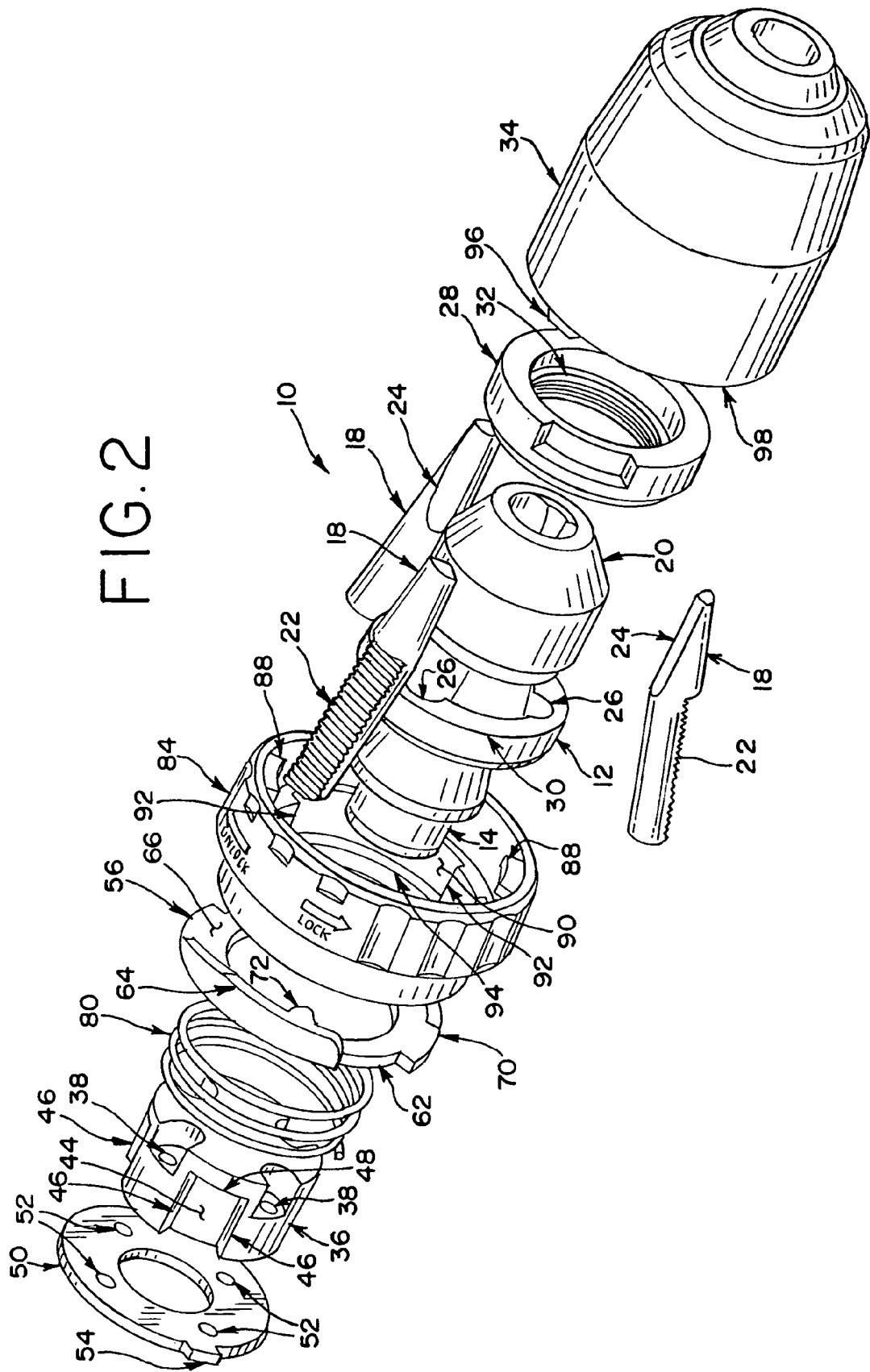
FIG. 2 is an exploded, perspective view of the chuck.

Referring now to the drawings, and particularly to FIGS. 1 through 12, one embodiment of an auto-lock chuck 10 is shown. As shown in FIG. 4, the auto-lock chuck 10 includes a body 12 that may be threadably attached at the rear end 14 thereof to the drive shaft 16 of a power tool. Thus, the body 12 is rotatable in response to rotation of the drive shaft 16. The auto-lock chuck 10 also includes a series of three jaws 18 at the forward end 20 thereof that are capable of gripping the shaft of a work tool. As shown in FIG. 2, each of the jaws 18 have threads 22 on the outside surfaces at the rear ends thereof and include jaw faces 24 on the inside surfaces at the front ends thereof. The jaws 18 are mounted within bores 26 angularly positioned through the body 12 and spaced equally thereabout. An adjustment ring 28 is mounted within a groove 30 in the body 12 and is longitudinally restrained by the groove 30. The adjustment ring 28 includes threads 32 on its inner diameter which are engaged with the threads 22 of the jaws 18. Accordingly, rotation of the adjustment ring 28 relative to the body 12 adjusts the jaws 18 by moving the jaws 18 between a small diametrical relationship and a large diametrical relationship. Thus, when the adjustment ring 28 and the body 12 are rotated relative to each other in one direction, the jaws 18 move towards each other in a tightening direction. Similarly, when the adjustment ring 28 and the body 12 are rotated relative to each other in the opposite direction, the jaws 18 move away from each other in a loosening direction. An outer sleeve 34 is pressed onto or otherwise fixed to the adjustment ring 28 so that the adjustment ring 28 may be manually manipulated when the body 12 is stationary by rotating the outer sleeve 34 in either the tightening or loosening direction to move the jaws 18 closer or farther apart.

As shown in FIGS. 2, 5, 8, 9 and 10, the auto-lock chuck 10 also includes a joint member 36, or guide member, positioned rearwardly of the body 12. The joint member 36 has holes 38 extending longitudinally therethrough so that the joint member 36 may be rigidly attached with screws to the frame 40 of the power tool. The joint member 36 also includes a central bore 42 extending therethrough for installing the drive shaft 16 of the power tool through. The joint member 36 also has longitudinal slots 44 equally spaced thereabout. The sides 46 of the slots 44 serve as guide surfaces which extend generally straight along the longitudinal axis of the chuck 10. The slots 44 also include rearwardly facing surfaces 48, or backstops, that serve as a forward stop for the impact member 56 described below.

As shown in FIGS. 2 and 7-9, a washer 50 may be installed behind the joint member 36. The washer 50 includes holes 52 extending therethrough which match the holes 38 in the joint member 36 so that the washer 50 is also rigidly attached to the frame 40 of the power tool when mounting screws are used to install the auto-lock chuck 10 on the power tool. As described below, the washer 50 serves as a backstop for the spring 80. Additionally, as further described below, the washer 50 is provided with a tab 54 that serves as a stop for the rotation of the locking sleeve 84.

As shown in FIGS. 2, 5 and 8-12, an impact member 56 is mounted about the joint member 36. The impact member 56 has four tabs 58 equally spaced about the inner diameter 68 that are sized to fit within the slots 44 of the joint member 36. The side surfaces 60 of the tabs 58 are designed to engage with the guide surfaces 46 of the joint member slots 44 in order to allow the impact member 56 to move rearward while preventing the impact member 56 from rotating. The rearwardly facing surfaces 48 of the joint member 36 also prevent the tabs 58 of the impact member 56 from moving forward past the front end of the joint member 36. Slots 62 are provided along the outer diameter 70 of the impact member 56 to allow the blocks 88 of the locking sleeve 84 to be assembled therethrough. The impact member 56 also includes circumferential surfaces 64, or ramps, extending from the front face 66 of the impact member 56 and longitudinally inclined therefrom. Preferably, the circumferential surfaces 64 are adjacent the outer diameter 70 of the impact member 56. Protrusions 72 that extend from the front face 66 of the impact member 56 are also provided. As shown in FIG. 10, each of the protrusions 72 have two opposing impact surfaces 74, 76 and a bypass surface 78 defined by the top of each protrusion 72. Preferably, the angled slope of each opposing impact surface 74, 76 is different from the other. For example, the first impact surface 74 used for tightening the jaws 18 as described below may have a slope that is less steep than the second impact surface 76 used for loosening the jaws 18.

As shown in FIGS. 2 and 7, a spring 80 is positioned between the washer 50 and the rear surface 82 of the impact member 56. Thus, the spring 80 biases the impact member 56 forward against the blocks 88 of the locking sleeve 84 as described below.

As shown in FIGS. 2, 5, 11 and 12, the locking sleeve 84, or locking member, may be used to control the position of the impact member 56. The outer diameter 70 of the impact member 56 is sized so that the inner diameter 86 of the locking sleeve 84 may freely rotate thereabout. The locking sleeve 84 also includes two blocks 88 that extend inward from the inner diameter 86 of the locking sleeve 84. The locking sleeve 84 is mounted on the auto-lock chuck 10 to allow the locking sleeve 84 to rotate relative to the impact member 56 and the joint member 36. As shown in FIG. 2, the locking sleeve 84 includes an internal oversized slot 90. When the auto-lock chuck 10 is assembled, the tab 54 of the washer 50 fits within the oversized slot 90. As a result, the washer tab 54 allows the locking sleeve 84 to rotate within a limited range of rotation since the washer tab 54 stops against the side surfaces 92 of the oversized slot 90. In addition, the locking sleeve 84 is provided with a forward facing surface 94 that engages the rear surface of the washer 50. This prevents the locking sleeve 84 from moving longitudinally forward. Accordingly, as shown in FIGS. 11 and 12, the impact member 56 may be forced rearward against the spring 80 by rotating the locking sleeve 84. As shown in FIG. 11, the locking sleeve 84 is rotated so that the blocks 88 of the locking sleeve 84 are adjacent the front face 66 of the impact member 56. In this configuration, the spring 80 biases the impact member 56 forward to its forwardmost position. As shown in FIG. 12, the locking sleeve 84 is rotated so that the locking sleeve blocks 88 follow the inclined circumferential ramp surfaces 64. Because the locking sleeve 84 is prevented from moving forward during rotation, the locking sleeve blocks 88 force the impact member 56 rearward against the bias of the spring 80.

As shown in FIGS. 2 and 6, the outer sleeve 34 is provided with protrusions 96 that extend rearwardly from the rear surface 98 of the outer sleeve 34. Preferably, the number of protrusions 96 matches the number of protrusions 72 on the impact member 56, which in this case is two. Each of the protrusions 96 has two opposing impact surfaces 100, 102 corresponding to the impact surfaces 74, 76 of the impact member protrusions 72. Like the impact member protrusions 72, each of the opposing impact surfaces 100, 102 may have angular slopes that are different from each other. For example, the first impact surface 100 of the outer sleeve 34 (corresponding to the first impact surface 74 of the impact member 56) may have a slope that is less steep than the second impact surface 102 (corresponding to the second impact surface 76 of the impact member 56). As described below, this provides for a greater impact when loosening the jaws 18 of the auto-lock chuck 10 (i.e., the second impact surfaces 76, 102 with steeper slopes) and less impact when tightening the jaws 18 of the auto-lock chuck 10 (i.e., the first impact surfaces 74, 100).

The operation of the auto-lock chuck 10 is now apparent. One advantage of the auto-lock chuck 10 is that the jaws 18 of the auto-lock chuck 10 can be tightened and/or loosened automatically using the rotation of the power tool drive shaft 16. Thus, in the embodiment described above, when the locking sleeve 84 is rotated to the unlocked position, where the locking sleeve blocks 88 are adjacent the front face 66 of the impact member 56, the spring 80 biases the impact member 56 forward. Then, when the drive shaft 16 of the power tool is rotated, the body 12 of the chuck 10, the adjustment ring 28 and the outer sleeve 34 rotate together with the drive shaft 16. However, as the outer sleeve 34 rotates, the outer sleeve protrusions 96 and the impact member protrusions 72 interfere with each other and impact against the corresponding impact surfaces 74, 76, 100, 102. For example, when the drive shaft 16 is rotated in one direction, the first impact surfaces 74, 100 will impact against each other (i.e., tightening). When the drive shaft 16 is rotated in the opposite direction, the second impact surfaces 76, 102 will impact against each other (i.e., loosening). Because of the impacts between the outer sleeve protrusions 96 and the impact member protrusions 72, the rotational movement of the outer sleeve 34 is restricted relative to the body 12 of the auto-lock chuck 10. This causes the adjustment sleeve 28 to slow rotation, thereby producing relative rotation between the body 12 and the adjustment ring 28. As a result, the threaded engagement 22, 32 between the adjustment ring 28 and the jaws 18 causes the jaws 18 to tighten or loosen depending on the rotation of the drive shaft 16. Because the angled slope of the first impact surfaces 74, 100 are less steep than the second impact surfaces 76, 102, the tightening torque of each impact in the tightening direction is less than the loosening torque of each impact in the loosening direction. Once the impact force between the outer sleeve protrusions 96 and the impact member protrusions 72 is sufficient to overcome the bias of the spring 80, the impact member 56 moves rearward against the spring 80, and the outer sleeve protrusions 96 and impact member protrusions 72 separate. The outer sleeve 34 then begins to rotate with the body 12 again. Thus, the outer sleeve protrusions 96 rotate by the bypass surfaces 78 of the impact member protrusions 72. Once the outer sleeve protrusions 96 have rotated past the bypass surfaces 78 of the impact member protrusions 72, the spring 80 biases the impact member 56 forward again. As a result, the protrusions 96, 72 of the outer sleeve 34 and impact member 56 repeatedly impact as the drive shaft 16 rotates so that the jaws 18 continue to loosen or tighten.

Another advantage of the auto-lock chuck 10 is that the locking sleeve 84 may be used to disengage the outer sleeve protrusions 96 and the impact member protrusions 72. As described above, when the locking sleeve 84 is rotated to the locked position, where the locking sleeve blocks 88 are adjacent the inclined circumferential surfaces 64, the impact member 56 is forced rearward against the spring 80. As a result, the impact member protrusions 72 are forced rearward. Therefore, when the outer sleeve 34 rotates with the drive shaft 16, the impact member protrusions 72 and outer sleeve protrusions 96 do not impact. Thus, in this configuration, the outer sleeve 34 rotates smoothly without experiencing any impacts from the protrusions 72, 96. Because of this, no loosening or tightening torque is applied to the adjustment ring 28 when the impact member 56 is locked rearward. A further advantage is that the outer sleeve 34 may be manually operated like a conventional forward sleeve of a chuck to hand tighten or loosen the jaws 18 if desired.

Figure 13:
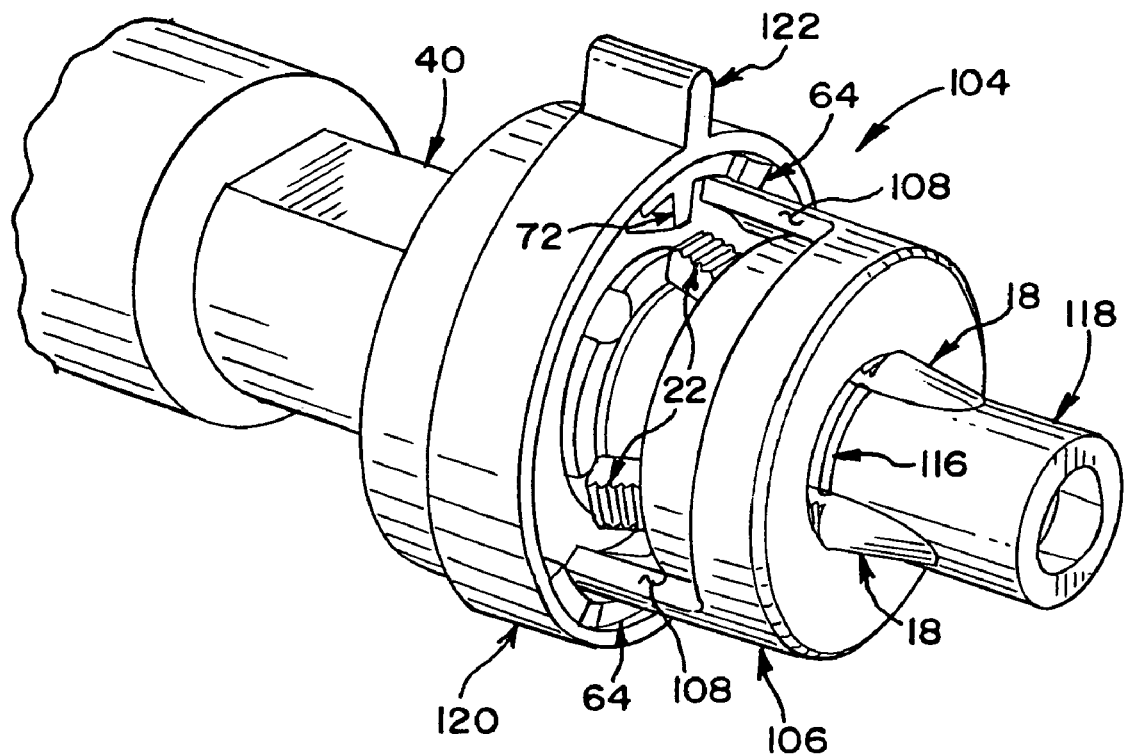
FIG. 13 is a perspective view of another embodiment of a chuck, showing the housing removed.
Figure 14:
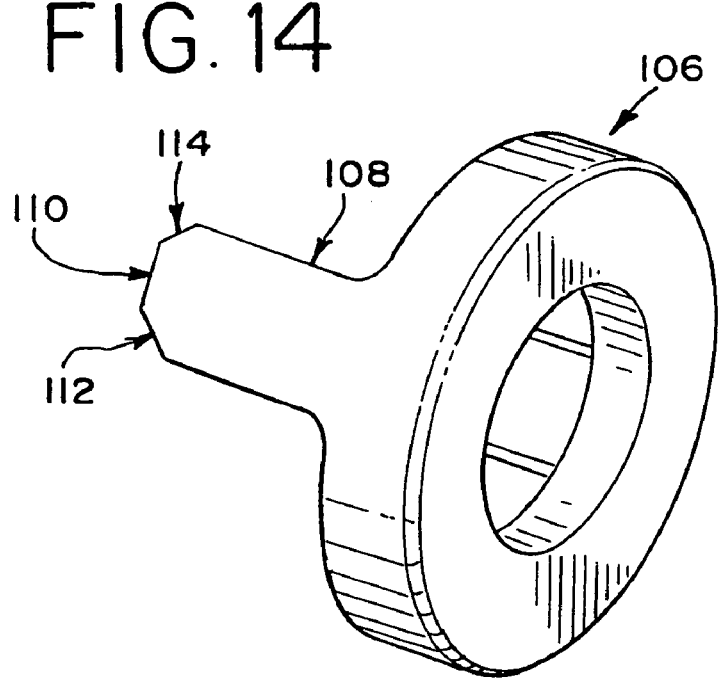
FIG. 14 is a perspective view of the inner sleeve of the chuck.
Figure 15:
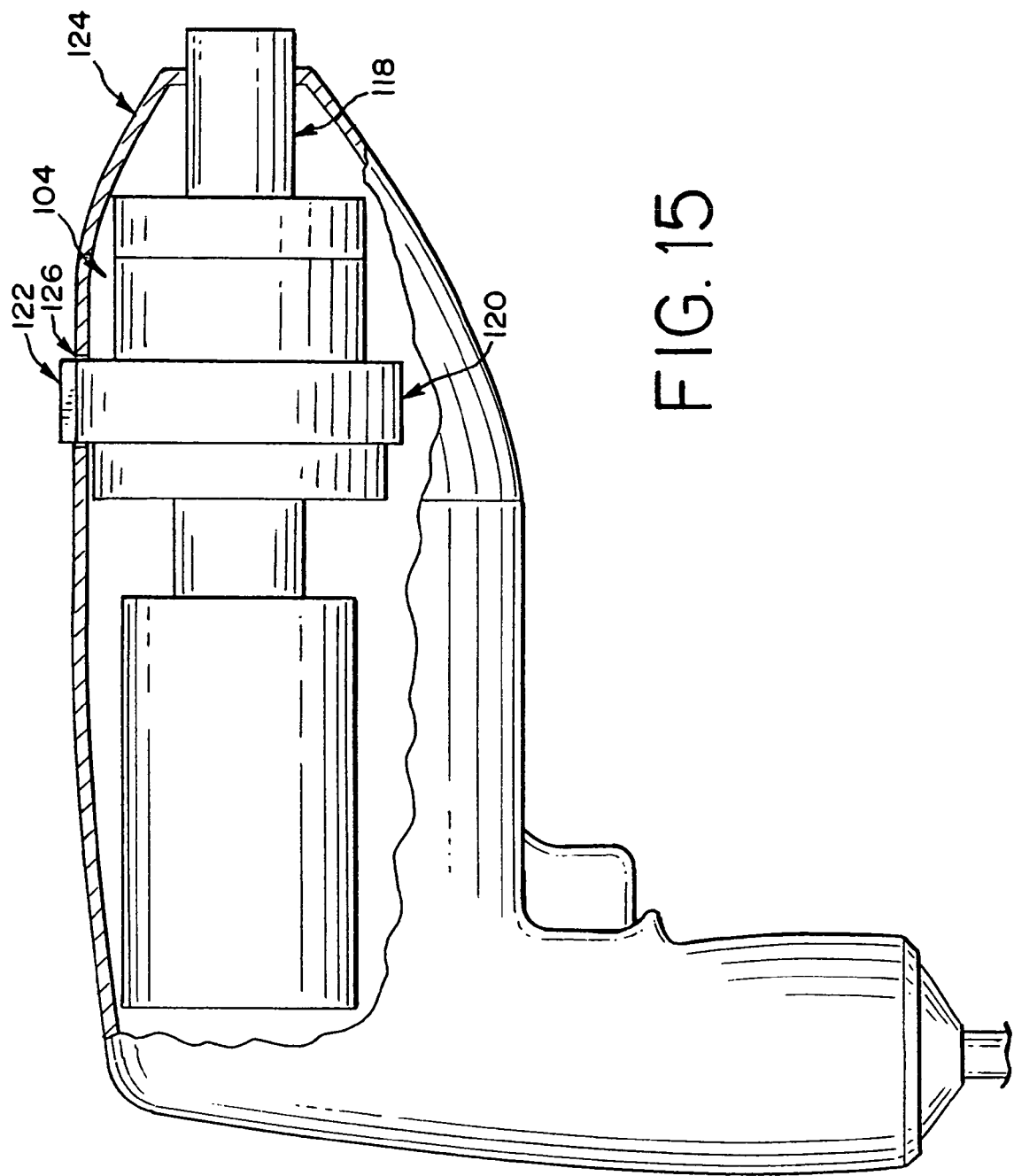
FIG. 15 is a side view of the chuck mounted within the housing of a power tool.

Referring now to FIGS. 13 through 15, another embodiment of an auto-lock chuck 104 is shown. The manner of operation and some of the features of the auto-lock chuck 104 shown in FIGS. 13-15 are similar to the embodiment described above. Therefore, it is unnecessary to repeat every similarity between the embodiments for a complete understanding.

As shown in FIGS. 13 and 14, an inner sleeve 106 is provided with two arms 108 that extend rearwardly therefrom to the impact member 56. The inner sleeve 106 may be made integral with the adjustment ring with threads formed on the inner diameter thereof, or the inner sleeve 106 may be pressed onto or otherwise fixed to a separate adjustment ring. The rearward ends of the arms 108 form protrusions 110 that are similar in function to the outer sleeve protrusions 96 described above. As described above, the protrusions 110 may have opposing impact surfaces 112, 114, with the first impact surfaces 112 having angular slopes that are less steep than the second impact surfaces 114. A retaining ring 116 may be used to longitudinally restrain the inner sleeve 106 and adjustment ring onto the body 118. The locking sleeve 120 is also similar to the locking sleeve 84 described above, but a lever 122 is provided which extends radially outward from the outer diameter of the locking sleeve 120.

The manner of operation of the auto-lock chuck 104 shown in FIGS. 13-15 is similar to the auto-lock chuck 10 described above. However, one advantage of this embodiment is that the chuck 104 may be positioned within a housing 124 that is fixedly connected to the frame of the power tool. The housing 124 may be fixedly connected to the frame of a power tool by screws or other fastening techniques or may be fixedly connected by being integrally formed with the power tool frame. Thus, the housing 124 may encompass the body 118 of the auto-lock chuck 104 and the other components thereof. In this embodiment, the housing 124 is not operably connected to the inner sleeve 106 and adjustment ring. As a result, a conventional forward sleeve is not needed for the auto-lock chuck 104. This may lower the cost of the auto-lock chuck 104 and provide for a cleaner appearance of the power tool. In addition, an opening 126 may be provided through the housing 124 for the lever 122 of the locking sleeve 120 to extend therethrough. Thus, the locking sleeve 120 may be operated by moving the lever 122 back-and-forth through the opening 126. Another advantage of using a housing fixedly connected to the frame is that a separate joint member may not be needed since the impact member may be guided rearward by features integrated into the frame of the power tool.

Figures 16, 17:
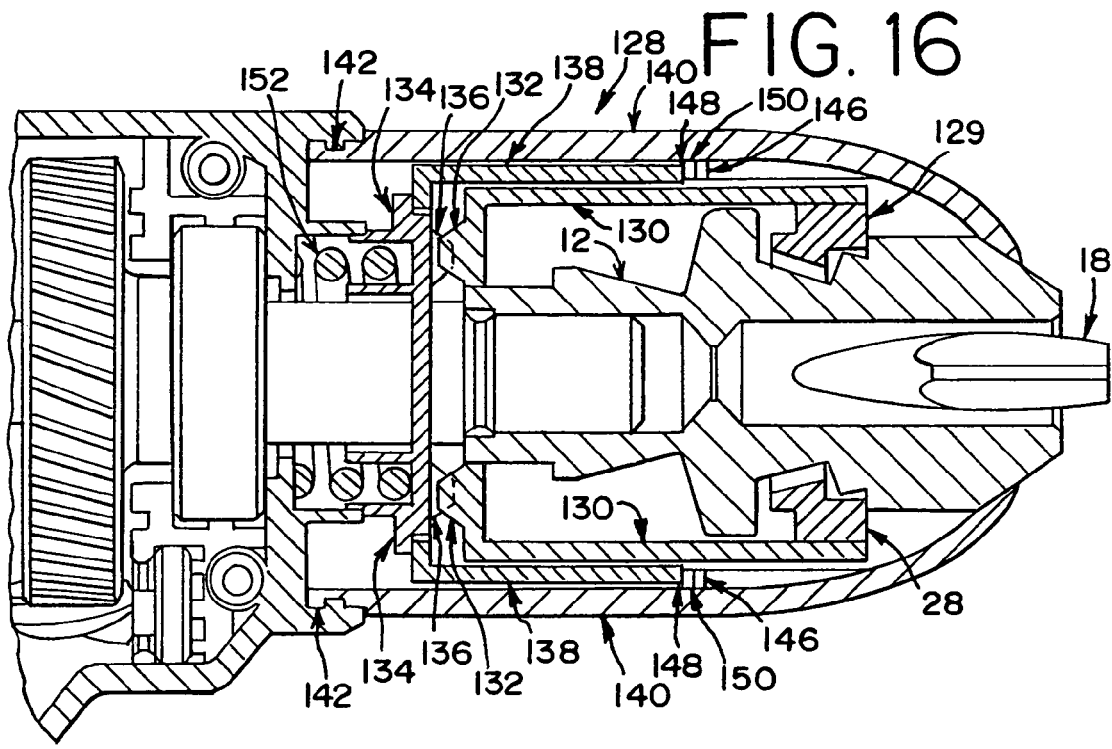
FIG. 16 is a cross-sectional view of another embodiment of a chuck.
FIG. 17 is a perspective view of another embodiment of a chuck.

Referring now to FIG. 16, another embodiment of an auto-lock chuck 128 is shown. The manner of operation and some of the features of the auto-lock chuck 128 shown in FIG. 16 are similar to the embodiments described above. Therefore, it is unnecessary to repeat every similarity for a complete understanding.

As shown in FIG. 16, an inner sleeve 130 is provided which extends rearwardly and includes protrusions 132 at the rear end thereof. The inner sleeve 130 may be pressed onto or otherwise fixed to the adjustment ring 129. The protrusions 132 are similar to the protrusions 96, 110 described above. Similarly, the impact member 134 includes forward-facing protrusions 136 similar to the impact member protrusions 72 described above. The impact member 134 also includes an interlinking sleeve 138, or flange, that extends radially outward toward the inner diameter of the outer sleeve 140. The interlinking sleeve 138 may also extend forward between the inner sleeve 132 and the outer sleeve 140 as shown. The outer sleeve 140 is longitudinally restrained relative to the body 12 with interlocked grooves 142 or by other means. The outer sleeve 140 also includes inner blocks 146 that engage the forward end 148 of the interlinking sleeve 138. A ramp 150 is formed between each of the inner blocks 146 and the interlinking sleeve 138 by either providing longitudinally inclined surfaces on the inner blocks 146 or the interlinking sleeve 138 or both.

The manner of operation of the auto-lock chuck 128 shown in FIG. 16 is similar to the auto-lock chucks 10, 104 described above: However, one advantage of this embodiment is that the outer sleeve 140 functions as a locking member. Thus, when the outer sleeve 140 is rotated in one direction, the inner blocks 146 force the interlinking sleeve 138 and the impact member 134 rearward against the spring 152 to disengage the impact member protrusions 136 and the inner sleeve protrusions 132. Thus, when the impact member 134 is forced rearward, impacts between the protrusions 132, 136 are prevented in order to provide smooth rotation of the inner sleeve 130 and the adjustment ring 129. When the outer sleeve 140 is rotated in the opposite direction, the inner blocks 146 allow the interlinking sleeve 138 and the impact member 134 to move forward so that the protrusions 132, 136 engage and impact against each other. Thus, the jaws 18 of the auto-lock chuck 128 may be automatically tightened and loosened by rotating the drive shaft 16 of the power tool as described above.

Referring now to FIGS. 17 through 27, another embodiment of an auto-lock chuck 156 is shown. The manner of operation and some of the features of the auto-lock chuck 156 shown in FIGS. 17-27 are similar to the embodiments described above. Therefore, it is unnecessary to repeat every similarity for a complete understanding.

Figure 18:
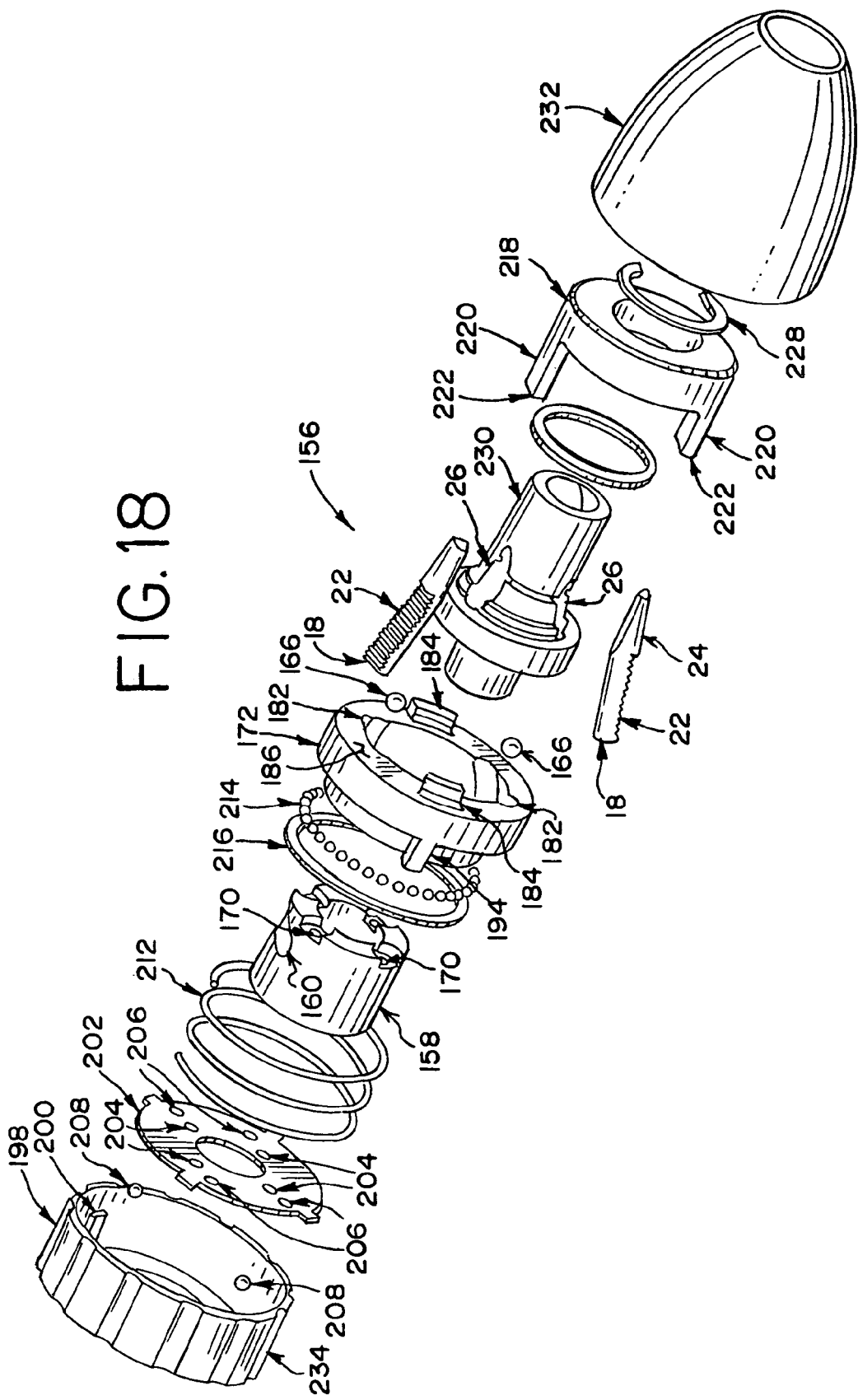
FIG. 18 is an exploded, perspective view of the chuck.
Figure 19:
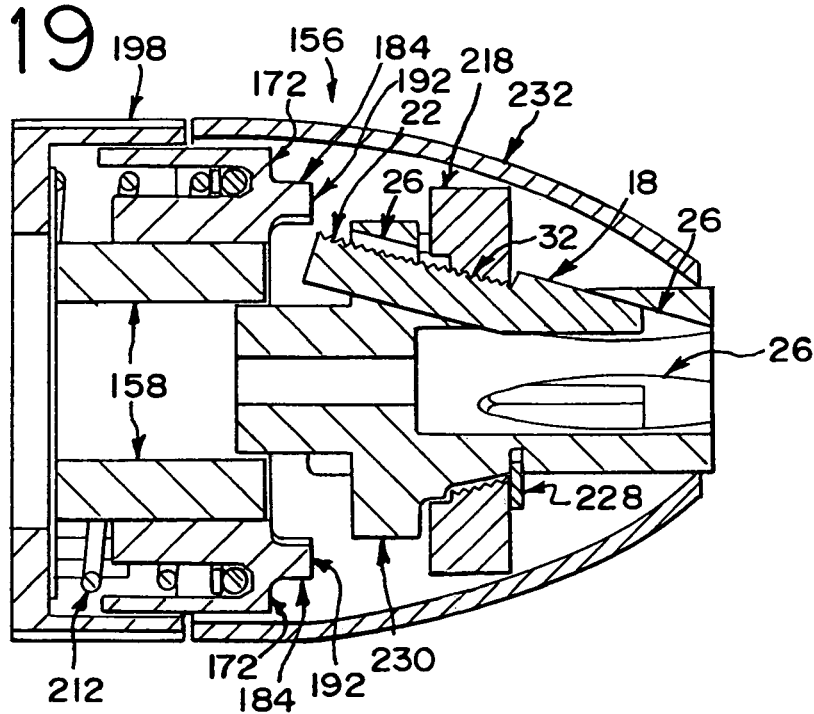
FIG. 19 is a cross-sectional view of the chuck.
Figure 20:
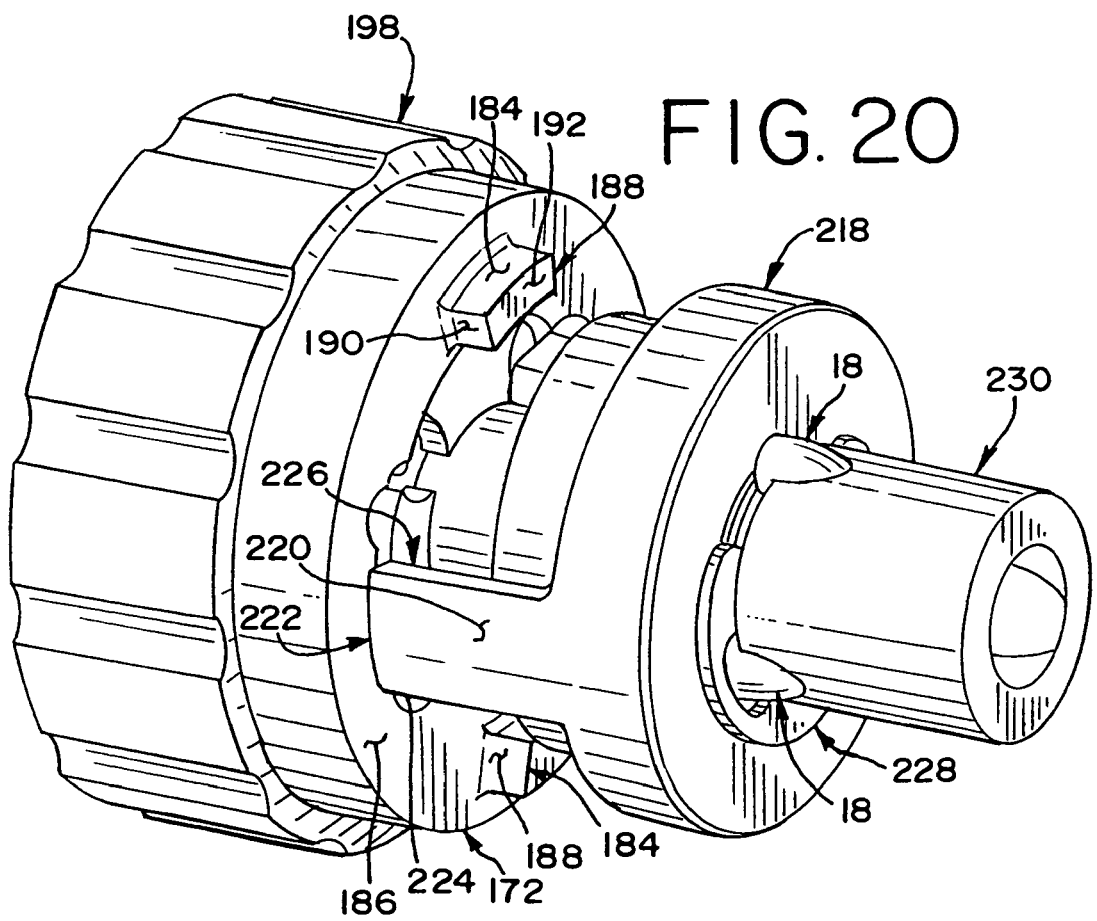
FIG. 20 is a perspective view of the chuck, showing the outer sleeve or housing removed.

As shown in FIGS. 18 and 22-23, the joint member 158 is provided with two V-shaped circumferential grooves 160. Each V-shaped circumferential groove 160 is formed by a first and second circumferential groove 162, 164, with the first circumferential groove 162 corresponding to the tightening direction and the second circumferential groove 164 corresponding to the loosening direction. The tightening and loosening directions are described herein for reference and may be reversed if desired. Preferably, the circumferential grooves 160 have a spherical shape to accept a ball 166. In addition, the apex 168 of each V-shaped circumferential groove 160 may be near the forward end of the joint member 158 with the legs extending longitudinally rearward. Thus, the first and second circumferential grooves 162, 164 act like inclined ramps. Like the joint member 36 described above, the rotational movement of the joint member 158 is limited by attaching the joint member 158 to the frame 40 of the power tool with screws that extend through holes 170 in the joint member 158.

As shown in FIGS. 18 and 21-23, the impact member 172 is mounted about the joint member 158. The impact member 172 has two V-shaped circumferential grooves 174 that correspond to the V-shaped circumferential grooves 160 of the joint member 158. Each V-shaped circumferential groove 174 is formed by a first and second circumferential groove 176, 178, with the first circumferential groove 176 corresponding to the tightening direction and the second circumferential groove 178 corresponding to the loosening direction. Like the joint member circumferential grooves 160, the impact member circumferential grooves 174 have a spherical shape to accept a ball 166 engaged with the joint member circumferential grooves 160. Preferably, the apex 180 of each V-shaped circumferential groove 174 may be near the rear end of the impact member 172 with the legs extending longitudinally forward. Thus, the first and second circumferential grooves 176, 178 act like inclined ramps. As shown in FIG. 23, the impact member 172 is mounted on the joint member 158 with balls 166 engaged in each of the V-shaped circumferential grooves 160, 174. To help with assembly, an inlet groove 182 for each ball 166 may be provided at the end of the circumferential grooves 174. The impact member 172 also includes two protrusions 184 that extend forward from the front face 186 of the impact member 172. As shown in FIG. 21, each of the protrusions 184 have two opposing impact surfaces 188, 190 and a bypass surface 192 defined by the top of each protrusion. As shown, the impact surfaces 188, 190 may be straight along the longitudinal axis of the auto-lock chuck 156. As further described below, the first impact surface 188 is used for tightening the jaws 18 and the second impact surface 190 is used for loosening the jaws 18. As shown in FIGS. 21 and 24, the impact member 172 may also include lock arms 194 that extend rearward from the rear surface 196 of the impact member 172. As described below, the lock arms 194 may be engaged with the locking sleeve 198 to disengage the protrusions 184 of the impact member 172 and the protrusions 222 of the inner sleeve 218.

As shown in FIGS. 18 and 24, the locking sleeve 198 is provided with inner blocks 200 extending inward from the inner diameter of the locking sleeve 198. The locking sleeve 198 is mounted on the auto-lock chuck 156 to allow the locking sleeve 198 to rotate. Thus, by rotating the locking sleeve 198, the inner blocks 200 may engage the lock arms 194 to rotate the impact member 172. As described below, this allows the locking sleeve 198 to disengage the impact member 172 from the inner sleeve 218.

As shown in FIGS. 18 and 24, a washer 202 may be mounted behind the joint member 158. The washer 202 includes holes 204 extending therethrough which match the holes 170 extending through the joint member 158 so that the washer 202 is rigidly attached to the frame 40 of the power tool when mounting screws are used to install the auto-lock chuck 156. The washer 202 is also provided with detent holes 206 for positioning the locking sleeve 198. Accordingly, balls 208 may be positioned between the rear face of the washer 202 and the front face of the locking sleeve 198. The balls 208 are received by the detent holes 206 in the washer 202 and recesses 210 in the front face of the locking sleeve 198. As a result, the locking sleeve 198 may be provided with detent positions to positively retain the locking sleeve 198 in a desired position.

As shown in FIG. 18, a spring 212 is positioned between the washer 202 and the impact member 172. Thus, the spring 212 biases the impact member 172 forward to engage the impact member protrusions 184 with the inner sleeve protrusions 222 as described below. In order to allow free rotation between the spring 212 and the impact member 172, a bearing 214 made of balls and a washer 216 are provided between the spring 212 and the rear surface 196 of the impact member 172.

Figure 25:
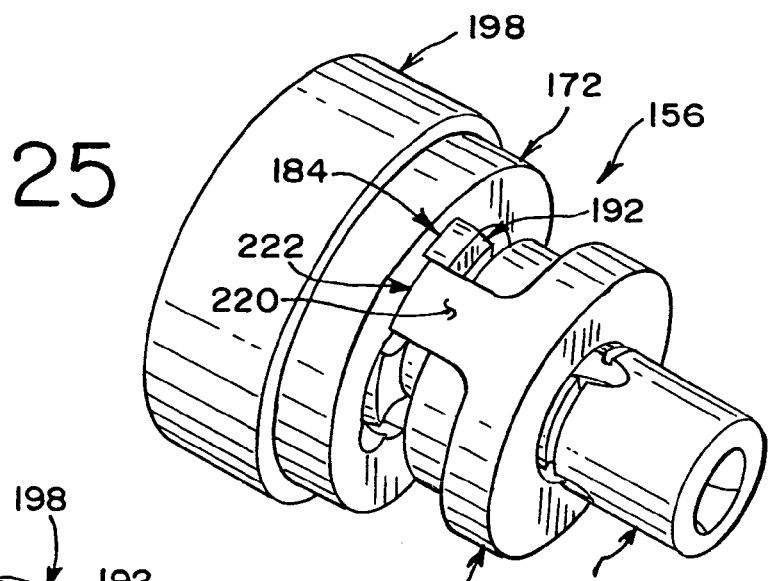
FIG. 25 is a perspective view of the chuck, showing the inner sleeve and the impact member engaged.
Figure 26:
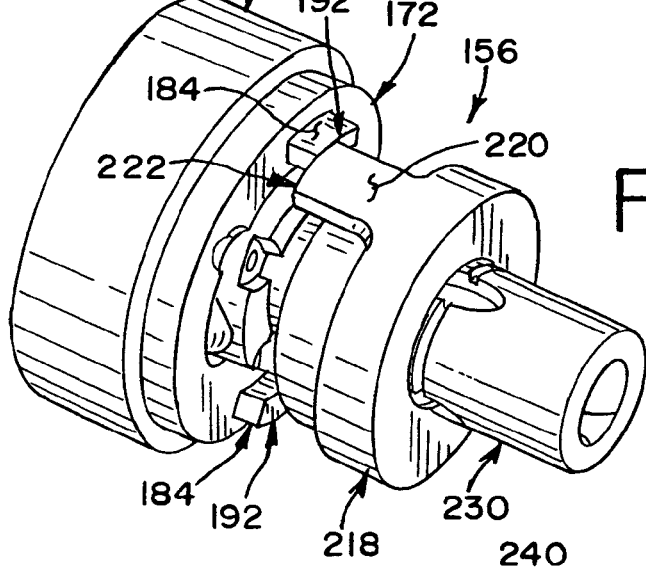
FIG. 26 is a perspective view of the chuck, showing the inner sleeve and the impact member disengaged.

As shown in FIGS. 18 and 25-26, an inner sleeve 218 is provided with two arms 220 that extend rearwardly to the impact member 172. The inner sleeve 218 may be made integral with the adjustment ring with threads formed on the inner diameter thereof, or the inner sleeve 218 may be pressed onto or otherwise fixed to a separate adjustment ring. The rearward ends of the arms 220 form protrusions 222. The protrusions 222 have opposing first and second impact surfaces 224, 226, which may be longitudinally straight along the longitudinal axis of the auto-lock chuck 156. A retaining ring 228 may be used to longitudinally restrain the adjustment ring 28 and the inner sleeve 218 onto the body 230.

Figure 27:
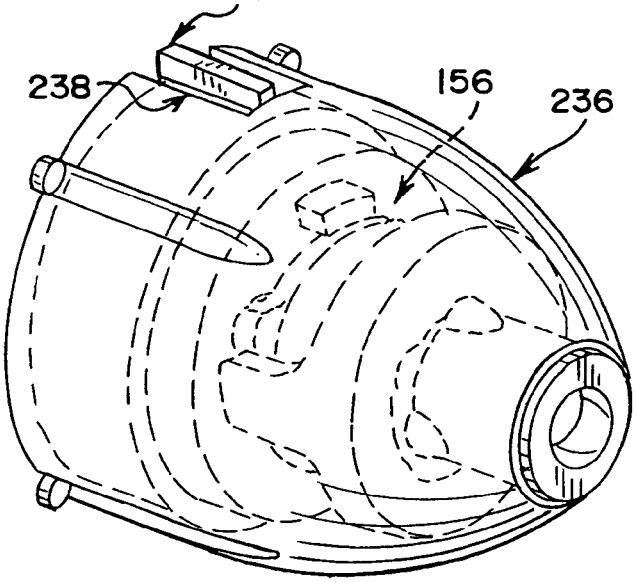
FIG. 27 is a perspective view of the chuck, showing a housing adapted to be attached to the frame of a power tool encompassing the chuck.

As shown in FIGS. 17 and 27, two different types of outer sleeves may be used. In FIG. 17, an outer sleeve 232 is shown that is pressed onto or otherwise fixed to the inner sleeve 218 and/or adjustment ring. In this embodiment, the adjustment ring may be manually manipulated by rotating the outer sleeve 232 in either the tightening or loosening direction to move the jaws 18 closer or farther apart. As shown, it may be preferably to provide the locking sleeve 198 with a grip 234 to allow the locking sleeve 198 to be easily grasped and rotated. In FIG. 27, a housing 236 is shown that may be fixedly attached to the frame 40 of the power tool. Thus, the housing 236 may encompass the body 230 of the auto-lock chuck 156 and the other components thereof. In this embodiment, the housing 236 is not operably connected to the inner sleeve 218 and adjustment ring so that the inner sleeve 218 and adjustment ring rotate freely inside the housing 236. An opening 238 through the housing 236 may also be provided so that the locking sleeve 198 may be provided with a lever 240 that extends through the opening 238. Thus, the locking sleeve 198 may be operated by moving the lever 240 through the opening 238.

The manner of operation of the auto-lock chuck 156 shown in FIGS. 17-27 is now apparent. The auto-lock chuck 156 functions similarly to the embodiments described above, and thus, not every similarity need be repeated. One advantage of the embodiment shown in FIGS. 17-27 is that the impacts to the inner sleeve 218 and adjustment ring may be smoother. This may minimize the chances that the auto-lock chuck 156 may jam and may also reduce damage to the motor and gear train by reducing the peak torques caused by impacts between the inner sleeve 218 and the impact member 172. As a result, the auto-lock chuck 156 may be more useful for low torque operations.

As described above, the inner sleeve 218 and adjustment ring tend to rotate with the body 230 of the auto-lock chuck 156 when the drive shaft 16 of the power tool is rotated. However, when the impact surfaces 224, 226 of the inner sleeve protrusions 222 impact against the impact surfaces 188, 190 of the impact member protrusions 184, the rotational speed of the adjustment ring is slowed relative to the body 230. This causes the threaded engagement between the adjustment ring and the jaws 18 to either tighten or loosen the jaws 18 depending on the direction the drive shaft 16 is rotating. This may be seen in FIG. 25. Continued rotation of the body 230 then causes the impact member 172 to rotate with the inner sleeve 218 and the adjustment ring. As the impact member 172 rotates, the circumferential grooves 162, 164, 176, 178 guide the impact member 172 rearward. The rearward movement of the impact member 172 also biases the spring 212. This creates a resistance torque that limits the rotation of the impact member 172, thereby inducing a tightening or loosening torque in the threaded engagement between the adjustment ring and the jaws 18. As shown in FIG. 26, once a sufficient amount of torque is applied to the impact member 172 to force the impact member 172 fully rearward, the protrusions 184, 222 of the impact member 172 and the inner sleeve 218 disengage. The inner sleeve protrusions 222 then rotate past the bypass surfaces 192 of the impact member protrusions 184. Once the inner sleeve protrusions 222 rotate fully past the impact member protrusions 184, the spring 212 biases the impact member 172 forward again. As the drive shaft 16 continues to rotate, the protrusions 184, 222 repeatedly impact against each other to further tighten or loosen the jaws 18 depending on the direction of rotation of the drive shaft 16.

The locking sleeve 198 may be used to disengage the inner sleeve protrusions 222 and impact member protrusions 184 once the jaws 18 are fully tightened or loosened. This is accomplished by rotating the locking sleeve 198 to engage the inner blocks 200 of the locking sleeve 198 with the lock arms 194 of the impact member 172. The rotation of the locking sleeve 198 then causes the impact member 172 to rotate. As a result, the impact member 172 is guided rearward by the circumferential grooves 162, 164, 176, 178. By maintaining the locking sleeve 198 in this position, the impact member 172 remains in a rearward position. Therefore, when the inner sleeve 218 rotates, the protrusions 222 of the inner sleeve 218 rotate past the bypass surfaces 192 of the impact member protrusions 184 without impacting together. When the operator wishes to use the auto-locking/unlocking function again, the operator may rotate the locking sleeve 198 back, which releases the impact member 172 to move forward and engage the inner sleeve 218.

Referring now to FIGS. 28 through 31, an auto-lock chuck 242 is shown installed onto an electrically powered drill 244. Although the drill 244 shown in FIGS. 28-31 is an AC powered drill 244, other power tools may also be used. The manner of operation and some of the features of the auto-lock chuck 242 are similar to the embodiments described above. Therefore, it is unnecessary to repeat every similarity for a complete understanding.

Figure 28:
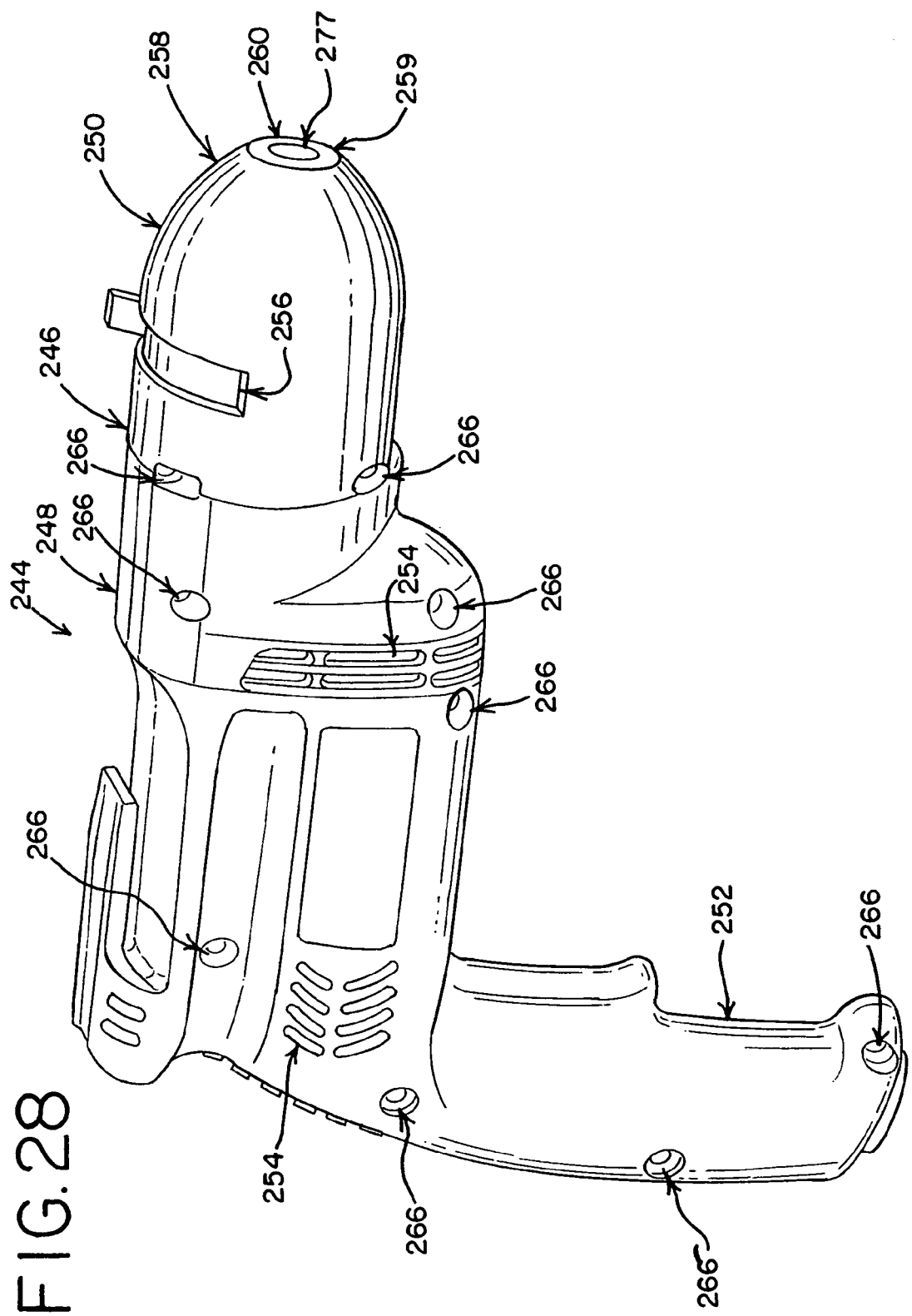
FIG. 28 is a perspective view of a drill, showing an integral tool housing enclosing the motor and an auto-lock chuck.

As shown in FIG. 28, an integral tool housing 246 may be used to encompass the motor and the chuck 242. The tool housing 246 is made up of a first housing portion 248 that encompasses the motor and other internal components and a second housing portion 250 that encompasses the chuck 242. The first housing portion 248 may also have a handle 252 for holding and controlling the drill 244 and vents 254 for cooling the motor. The second housing portion 250 may have a radial opening 256 extending therethrough to allow actuation of the locking member 272. The second housing portion 250 also includes an opening 259 that extends through the forward end 258 to allow work tools to be received through the opening 259 and into the axial bore 277 of the chuck 242. Thus, the forward end 258 of the second housing portion 250 may be positioned in proximity to the forward end 260 of the chuck body 276. One advantage of this configuration is that no adjustment sleeve is positioned between the forward end 258 of the second housing portion 250 and the forward end 260 of the chuck body 276. As a result, the drill 244 presents a clean forward end with an integrated auto-lock chuck 242 assembly. Thus, a separate chuck assembly attached to the forward end of the drill is not needed. Moreover, only a small portion of the rotatable chuck 242 is accessible to the user, thereby minimizing contact with the internal moving components of the chuck 242. Also, because there is no type of adjustment sleeve at the forward end, the user may be less concerned with inadvertently rotating an adjustment sleeve.

Figure 29:
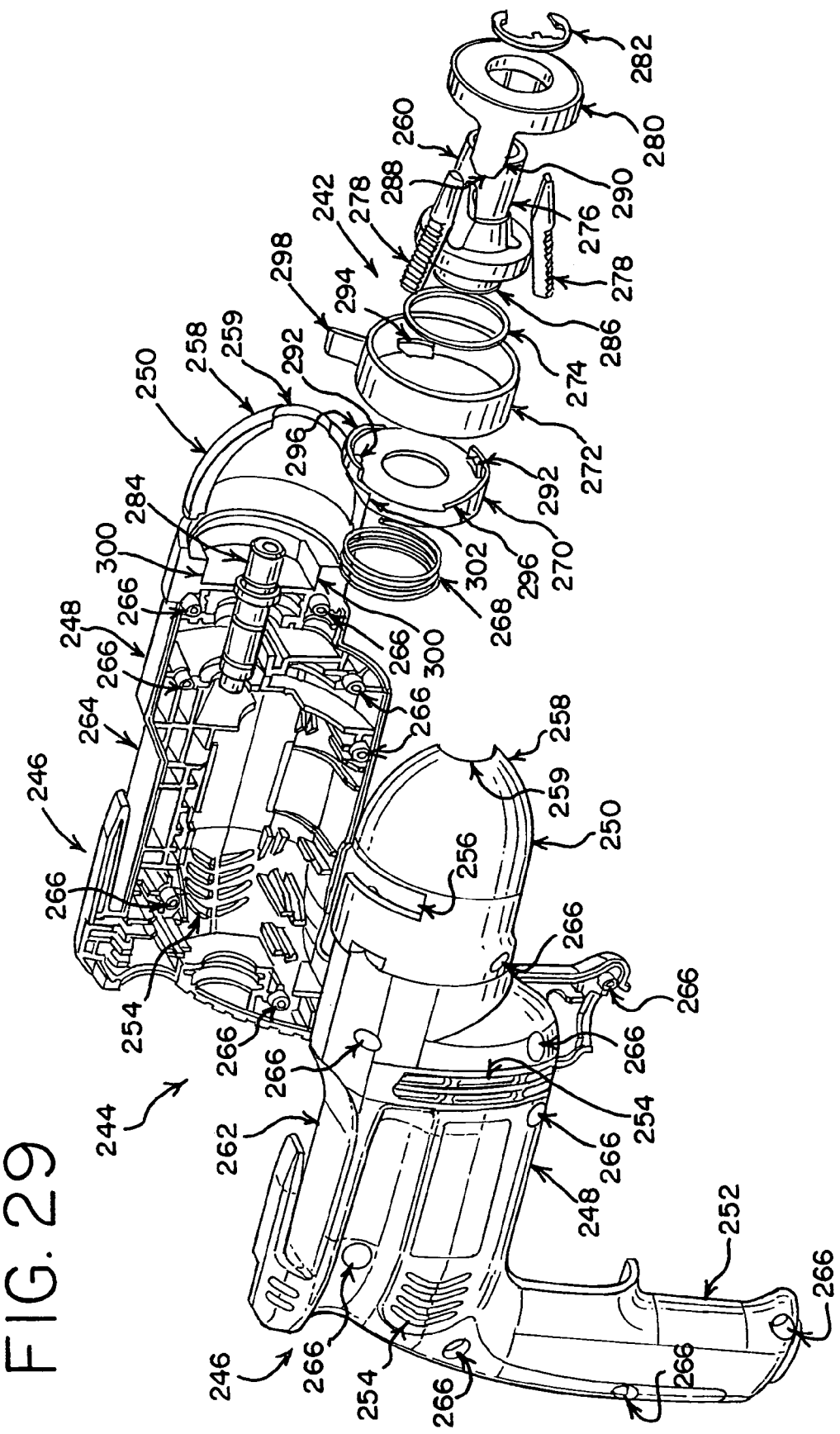
FIG. 29 is an exploded perspective view of the drill, showing the tool housing and the auto-lock chuck.

As shown in FIG. 29, the tool housing 246 may be made up of a first tool housing 262 and a second tool housing 264 that are separated along the longitudinal axis to form two sides of the tool housing 246. The first and second tool housings 262, 264 may be attached to each other by screws or other fasteners that pass through attachment holes 266 in the first and second tool housings 262, 264. The auto-lock chuck 242 may include a spring 268, an impact member 270, a locking member 272, a washer 274, a body 276, jaws 278, an inner sleeve 280 and a retaining ring 282. The features and manner of operation of the auto-lock chuck 242 are readily apparent from the detailed description above and need not be repeated here.

As described above, the drive shaft 284 of the drill 244 is connected to the rear end 286 of the chuck body 276. In general, the auto-lock chuck 242 operates by operably engaging a surface of the adjustment ring with the first housing portion 248. This causes the adjustment ring and the body 276 to rotate relative to each other to adjust the jaws 278 in response to the drive shaft 284. The adjustment ring may be engaged either directly or indirectly with the first tool housing 262 depending on the particular configuration of the auto-lock chuck 242 and the tool housing 246. For example, in the auto-lock chuck 242 shown in FIG. 29, the adjustment ring is integral with the inner sleeve 280. Protrusions 288 on the end of the inner sleeve arms 290 engage protrusions 292 on the impact member 270. Since the impact member 270 is engaged with the first housing portion 248, this causes the adjustment ring to rotate relative to the chuck body 276 to adjust the jaws 278 of the chuck 242. However, other arrangements are also possible. The locking member 272 may also be provided with blocks 294 that engage circumferential surfaces 296 on the impact member 270 to disengage the impact member 270 from the inner sleeve 280. The locking member 272 may have a lever 298 that extends through the radial opening 256 in the tool housing 246 to allow the locking member 272 to be manually actuated.

Figure 30:
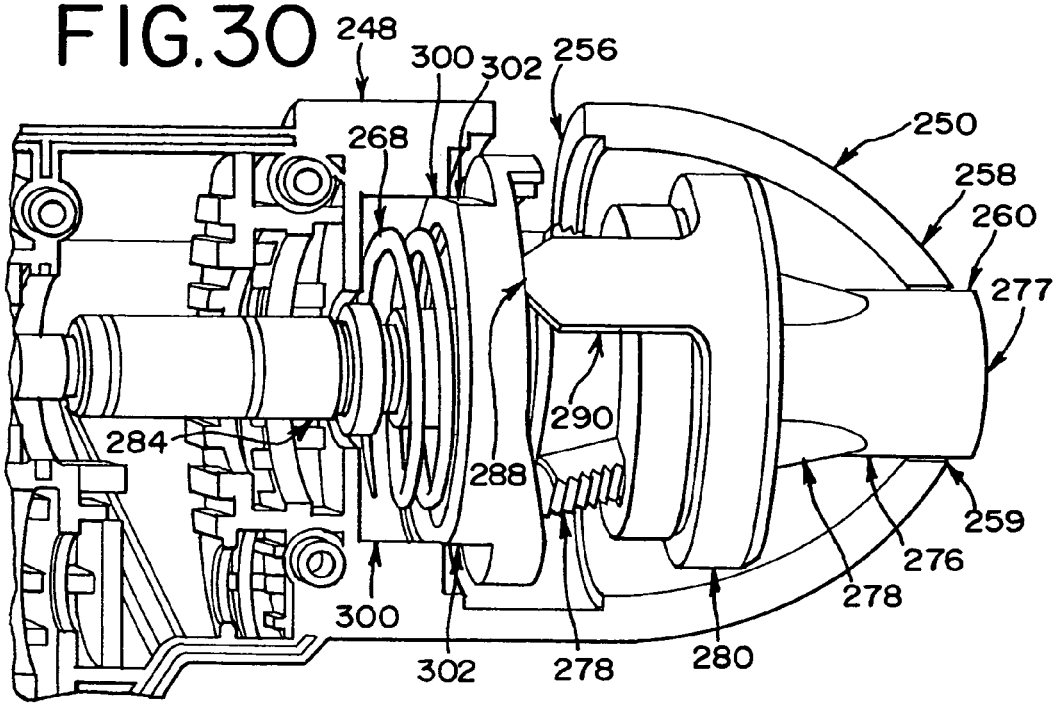
FIG. 30 is an enlarged elevational view of the forward end of the drill, showing the auto-lock chuck with an impact member positioned forward.
Figure 31:
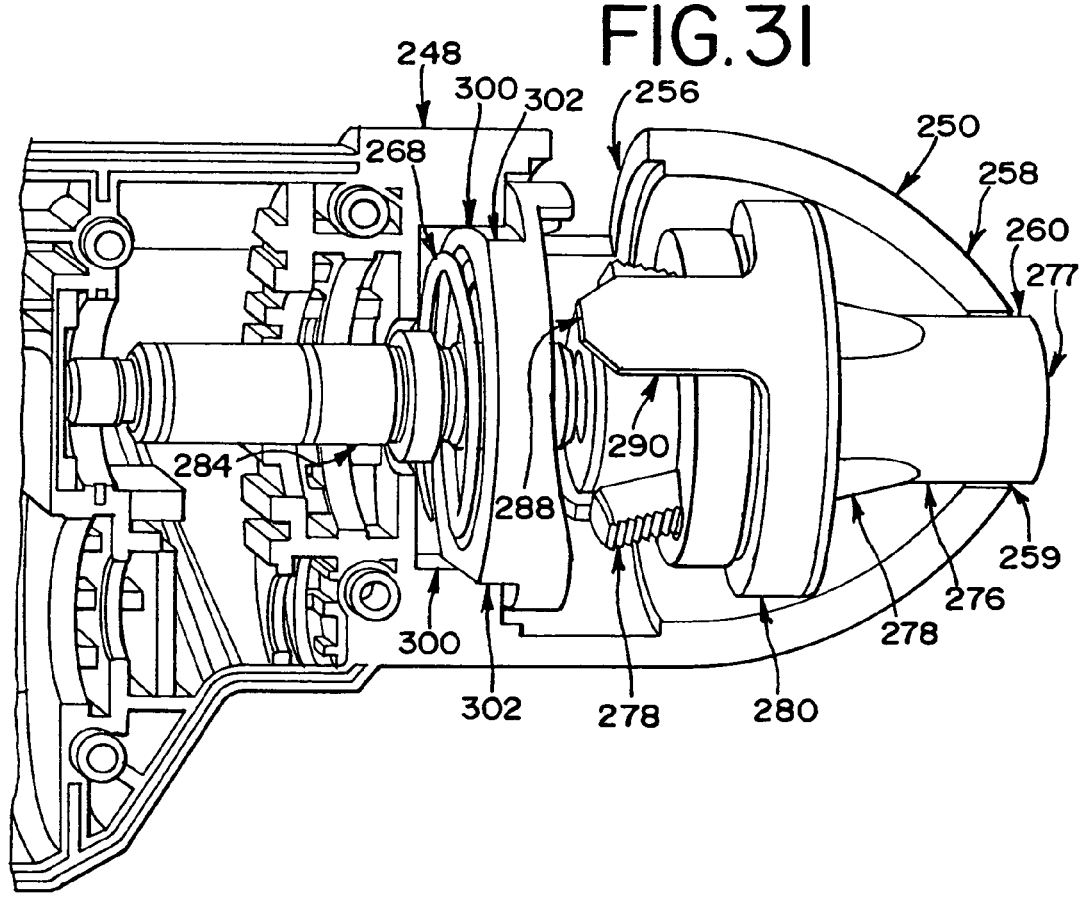
FIG. 31 is an enlarged elevational view of the forward end of the drill, showing the auto-lock chuck with the impact member positioned rearward.

As shown in FIGS. 30-31, the first housing portion 248 may have guide surfaces 300 formed therein. The impact member 270 may have corresponding side surfaces 302 engaged with the guide surfaces 300 of the first housing portion 248. Thus, the side surfaces 302 of the impact member 270 are restrained from rotating relative to the first housing portion 248 by the guide surfaces 300. However, the side surfaces 302 of the impact member 270 are axially moveable relative to the first housing portion guide surfaces 300. Accordingly, as shown in FIG. 30, the spring 268 biases the impact member 270 forward to engage the inner sleeve 280 with the impact member 270. As shown in FIG. 31, the impact member 270 may be forced rearwardly to compress the spring 268 by either actuating the locking member 272 (not shown in FIGS. 30-31) or by impacts between the protrusions 288 of the inner sleeve 280 and the protrusions 292 of the impact member 270.

One advantage of the embodiment shown in FIGS. 28-31 is that a separate joint member may be eliminated by providing guide surfaces 300 within the first housing portion 248 to guide the impact member 270. This may reduce the cost of the auto-lock chuck 242 and may provide a more compact assembly. Another advantage is that the second housing portion 250 may be integrated with the first housing portion 248. This may simplify manufacturing of the drill 244 and reduce costs. In addition, because the second housing portion 250 is fixed in place and cannot move rotationally or axially, the user may be able to better handle and control the drill 244 since a user may grasp the second housing portion 250 when the chuck 242 is rotating.

Figure 32:
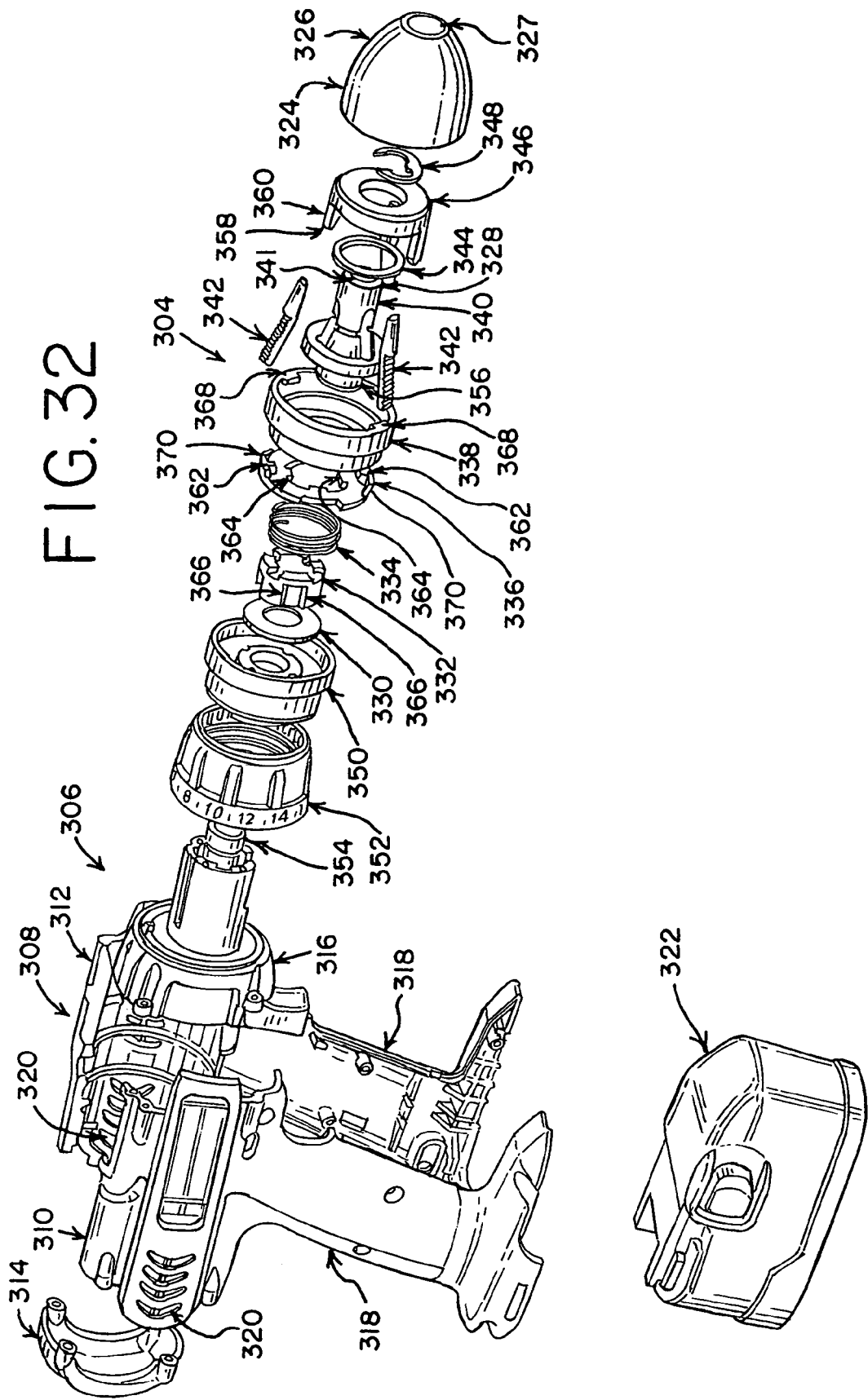
FIG. 32 is an exploded perspective view of another drill, showing a tool housing and an auto-lock chuck.
Figure 33:
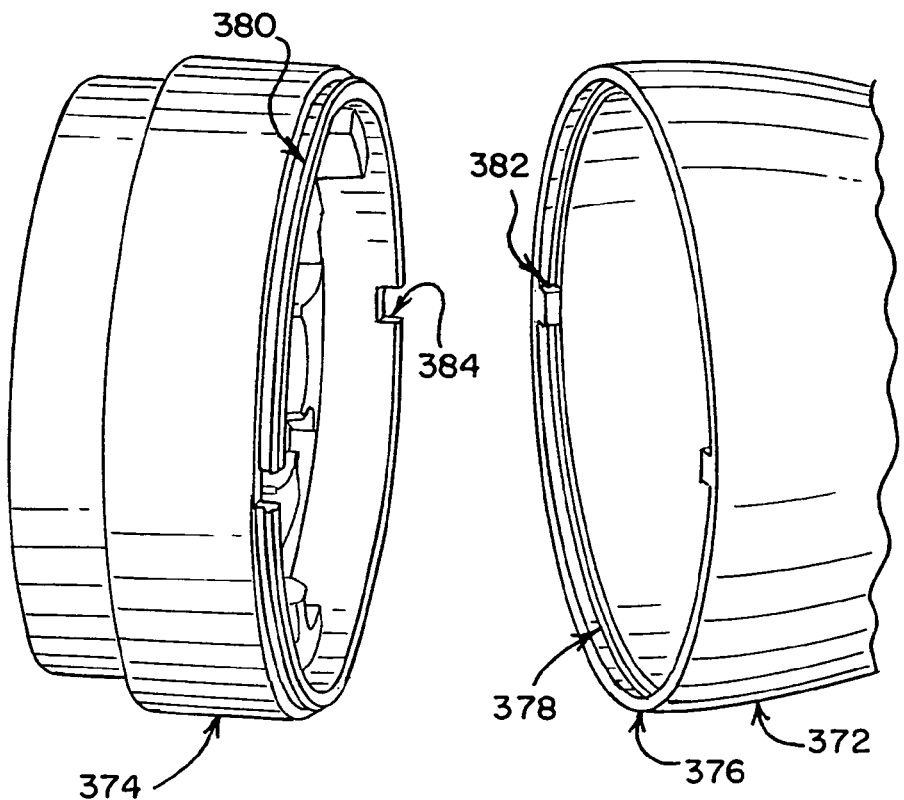
FIG. 33 is an enlarged perspective view of a front housing portion and a locking member, showing a way to rigidly attach the front housing portion to the locking member.
Figure 34:
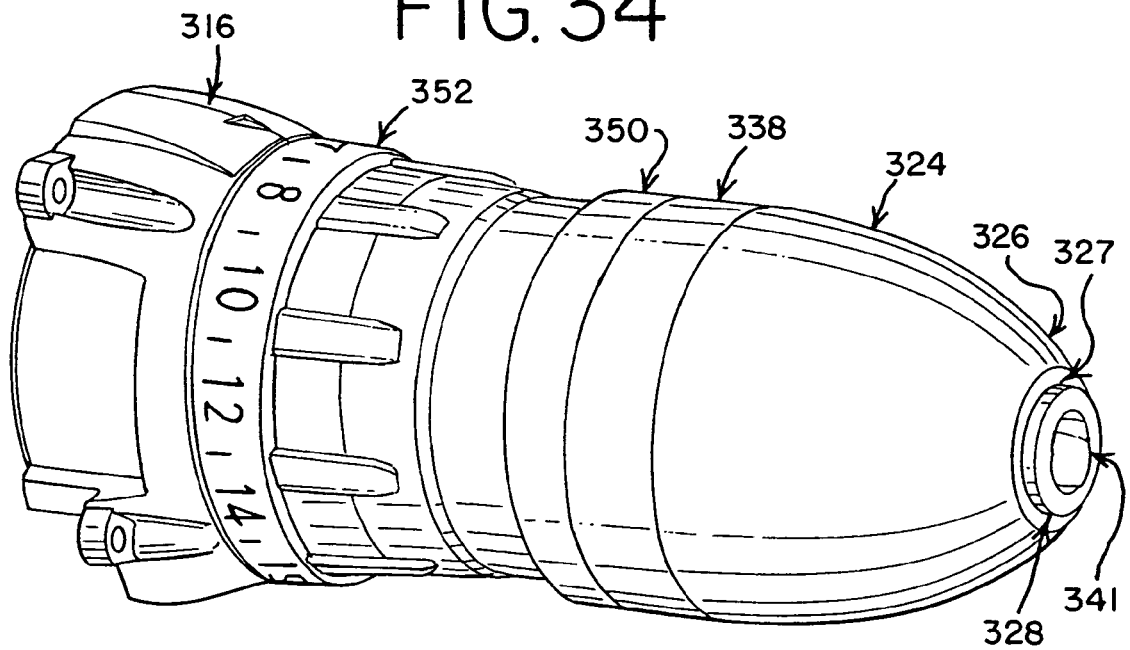
FIG. 34 is a perspective view of the front end of the drill, showing the front end of the chuck body, the front housing cover, the locking member, a spacer, a torque adjustment sleeve and a front housing.

Referring now to FIGS. 32 through 34, another auto-lock chuck 304 is shown installed onto an electrically powered drill 306. Although the drill 306 shown in FIGS. 32-34 is a DC powered drill 306, other power tools may also be used. The manner of operation and some of the features of the auto-lock chuck 304 are similar to the embodiments described above. Therefore, it is unnecessary to repeat every similarity for a complete understanding.

In this embodiment, the first housing portion 308 may be made up of right and left side housings 310, 312, a rear housing 314 and a front housing 316. The right and left side housings 310, 312 may include a handle 318 and vents 320 for the motor. A battery pack 322 may be attached to the bottom of the handle 318. The second housing portion 324, which encloses the chuck 304, may be fixedly connected indirectly to the first housing portion 308 or may be fixedly attached to the inner sleeve 346 and adjustment ring as described further below.

As shown in FIGS. 32 and 34, the second housing portion 324 includes an opening 327 that extends through the forward end 326 to allow work tools to be received through the opening 327 and into the axial bore 341 of the chuck 304. Thus, the forward end 326 of the second housing portion 324 may be positioned in proximity to the forward end 328 of the chuck body 340. Thus, a separate adjustment sleeve is not positioned between the forward end 326 of the second housing portion 324 and the forward end 328 of the chuck body 340.

The auto-lock chuck 304 may include a washer 330, joint member 332, spring 334, impact member 336, locking member 338, body 340, jaws 342, washer 344, inner sleeve 346 and retaining ring 348. A spacer 350 may also be provided to fixedly connect the auto-lock chuck 304 to the front housing 316. However, if desired, the spacer 350 may be eliminated and the chuck 304 may be directly connected to front housing 316. A torque adjustment sleeve 352 may also be provided rearward of the locking member 338. The details of the auto-lock chuck 304 are readily apparent from the descriptions above and need not be repeated here. As described above, the drive shaft 354 of the drill 306 is connected to the rear end 356 of the chuck body 340. In general, the auto-lock chuck 304 operates by operably engaging a surface of the adjustment ring with the first housing portion 308. This causes the adjustment ring and the body 340 to rotate relative to each other to adjust the jaws 342 in response to the drive shaft 354. In FIG. 32, the adjustment ring is integral with the inner sleeve 346. Protrusions 358 on the end of the inner sleeve arms 360 engage protrusions 362 on the impact member 336. The tabs 364 of the impact member 336 are engaged with the guide surfaces 366 of the joint member 332. Since the joint member 332 is engaged with the first housing portion 308 through the spacer 350 and the front housing 316, the adjustment ring is caused to rotate relative to the chuck body 340 to adjust the jaws 342 of the chuck 304. The locking member 338 may also be provided with blocks 368 that engage circumferential surfaces 370 on the impact member 336 to disengage the impact member 336 from the inner sleeve 346.

As shown in FIG. 33, in one configuration, the second housing portion 324, 372 may be fixedly connected to the first housing portion 308 through the locking member 338, 374. Accordingly, the rear end 376 of the second housing portion 372 may be rigidly attached to the locking member 374. This may be achieved in several ways. For example, as shown in FIG. 33, the rear end 376 of the second housing portion 372 may have an internal circular groove 378. The locking member 374 may also have a corresponding external circular rib 380 that receives the circular groove 378 of the second housing portion 372. Longitudinal tabs 382 on the second housing portion 372 are also received by longitudinal slots 384 in the locking member 374. Thus, the second housing portion 372 is rotatable with the locking member 374. Therefore, the second housing portion 372 is fixedly connected to the first housing portion 308 since the locking member 374 is fixedly connected to the first housing portion 308 through the impact member 336, joint member 332, washer 330, spacer 350 and front housing 316. Accordingly, in this configuration, the second housing portion 372 is not operably engaged with the adjustment ring. As a result, this configuration may provide improved handling and control characteristics because the second housing portion 372 does not rotate with the body 340 of the chuck 304. Thus, a user may grasp the second housing portion 372 while the drill 306 is being operated.

In another configuration, the second housing portion 324 may be fixedly attached to the inner sleeve 346 and adjustment ring. Thus, in this configuration, the second housing portion 324 functions like an outer sleeve 324 to allow the adjustment ring to be manually manipulated to adjust the jaws 342. This may be accomplished by pressing the outer sleeve 324 onto the inner sleeve 346 or otherwise fixing the outer sleeve 324 and the inner sleeve 346 together. Therefore, in this configuration, the outer sleeve 324 is not rigidly attached to the locking member 338 as described above. Accordingly, the outer sleeve 324 is not fixedly connected to the first housing portion 308. An advantage of this configuration is that the adjustment ring may be manually manipulated by turning the outer sleeve 329 to tighten and loosen the jaws 342. The locking member 338 may also be accessed as a full ring positioned rearward of the outer sleeve 324. A selector sleeve, such as the torque adjustment sleeve 352, may also be provided rearward of the locking member 338.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

We claim:
1. A rotatable chuck for use with a power tool having a drive shaft, comprising:
a body comprising a rear end adapted to be connected to a drive shaft of a power tool and a forward end adapted to receive a shaft of a work tool, said body thereby being rotatable in response to said drive shaft;
a plurality of jaws disposed within said forward end of said body, said jaws being moveable between a smaller diametrical relationship defined by said jaws and a larger diametrical relationship defined by said jaws, wherein said jaws are adapted to grip said shaft of said work tool whereby said body and said jaws transmit a force from said power tool to said work tool;
an adjustment ring mounted about said body and operably engaged with said jaws, said adjustment ring and said body being rotatable relative thereto in a tightening direction wherein said jaws move toward said smaller diametrical relationship and in a loosening direction wherein said jaws move toward said larger diametrical relationship;
a guide member adapted to be rotationally restrained relative to a frame of said power tool, rotational movement of said guide member thereby being limited relative to said body;
a guide surface connected to said guide member and extending along at least a longitudinal direction of said body;
an impact member operably engaged with said guide surface, said impact member thereby being moveable along said longitudinal direction;
a first protrusion connected to said impact member;
a second protrusion connected to said adjustment ring and rotatable therewith;
a spring biasing said first protrusion and said second protrusion into engagement, wherein said first protrusion restricts rotational movement of said second protrusion when said drive shaft of said power tool is rotated, said adjustment ring and said body thereby being rotatable relative thereto to adjust said jaws in response to rotation of said drive shaft; and
a locking member operably engaged with said impact member through a ramp disposed between said locking member and said impact member, said ramp being inclined along said longitudinal direction, and said locking member comprising a first position and a second position, wherein said first position biases said impact member against said spring to disengage said first protrusion and said second protrusion and said second position releases said impact member to engage said first protrusion and said second protrusion.

2. The rotatable chuck according to claim 1, wherein said ramp is a first circumferential groove connected to said impact member and engaged with a ball.

3. The rotatable chuck according to claim 2, wherein said locking member is a sleeve operably engaged with said impact member and adapted to rotate said impact member, said impact member thereby following said first circumferential groove and disengaging said first protrusion and said second protrusion.

4. The rotatable chuck according to claim 3, wherein said impact member is operably engaged with said guide surface through said first circumferential groove, said impact member thereby being moveable along said longitudinal direction.

5. The rotatable chuck according to claim 4, wherein said guide surface is a second circumferential groove engaged with said ball.

6. The rotatable chuck according to claim 5, wherein said first protrusion comprises a first impact surface and said second protrusion comprises a second impact surface, said first and second impact surfaces being substantially straight along said longitudinal direction.

7. The rotatable chuck according to claim 6, further comprising an outer sleeve fixedly attached to said adjustment ring, said outer sleeve adapted for manual manipulation to allow said adjustment ring to be manually adjusted.

8. The rotatable chuck according to claim 6, further comprising a housing encompassing said body and adapted to be fixedly connected to said frame, said housing being characterized by not being operably engaged with said adjustment ring.

9. The rotatable chuck according to claim 1, wherein said impact member is operably engaged with said guide surface through a first circumferential groove, said impact member thereby being moveable along said longitudinal direction, said guide surface being a second circumferential groove engaged with said ball, and further comprising a housing encompassing said body and adapted to be fixedly connected to said frame, said housing being characterized by not being operably engaged with said adjustment ring.

10. The rotatable chuck according to claim 1, wherein said ramp is a circumferential surface extending from a face of said impact member and longitudinally inclined therefrom.

11. The rotatable chuck according to claim 10, wherein said locking member is a sleeve operably engaged with said impact member and comprising a block operably engaged with said circumferential surface, said impact member thereby following said guide surface and disengaging said first protrusion and said second protrusion.

12. The rotatable chuck according to claim 11, wherein said guide surface comprises a generally straight first longitudinal surface and said impact member comprises a generally straight second longitudinal surface engaged with said first longitudinal surface, said impact member thereby being moveable along said longitudinal direction.

13. The rotatable chuck according to claim 12, wherein said first protrusion comprises a first impact surface and said second protrusion comprises a second impact surface, said first and second impact surfaces being generally angled relative to said longitudinal direction.

14. The rotatable chuck according to claim 13, further comprising an outer sleeve fixedly attached to said adjustment ring, said outer sleeve adapted for manual manipulation to allow said adjustment ring to be manually adjusted, said second protrusion being connected to said outer sleeve.

15. The rotatable chuck according to claim 13, further comprising a housing encompassing said body and adapted to be fixedly connected to said frame, said housing being characterized by not being operably engaged with said adjustment ring.

16. The rotatable chuck according to claim 1, wherein said first protrusion comprises a first impact surface and said second protrusion comprises a second impact surface, said first and second impact surfaces being generally angled relative to said longitudinal direction.

17. The rotatable chuck according to claim 16, wherein said first protrusion comprises a third impact surface and said second protrusion comprises a fourth impact surface, said first and second impact surfaces corresponding to a tightening direction of said jaws and said third and fourth impact surfaces corresponding to a loosening direction of said jaws, wherein one of said first and second impact surfaces is less steep than one of said third and fourth impact surfaces, whereby impacts in said tightening direction produce less tightening torque than impacts in said loosening direction.

18. The rotatable chuck according to claim 17, further comprising a housing adapted to be fixedly connected to said frame, said housing being characterized by not being operably engaged with said adjustment ring.

19. The rotatable chuck according to claim 1, further comprising two arms extending rearwardly from said adjustment ring, one of said second protrusion being formed at the rearward end of each of said arms.

20. The rotatable chuck according to claim 19, wherein said arms are formed integrally with said adjustment ring.

21. The rotatable chuck according to claim 20, further comprising an outer sleeve fixedly attached to said adjustment ring, said outer sleeve adapted for manual manipulation to allow said adjustment ring to be manually adjusted.

22. The rotatable chuck according to claim 1, further comprising a housing encompassing said body and adapted to be fixedly connected to said frame of said power tool, said housing being characterized by not being operably engaged with said adjustment ring.

23. The rotatable chuck according to claim 22, wherein said guide member is integral with said frame.

24. The rotatable chuck according to claim 1, further comprising a sleeve extending rearwardly from said adjustment ring, said protrusion being disposed along a rearward portion of said sleeve.

25. The rotatable chuck according to claim 1, wherein said locking member is an outer sleeve encompassing said body and comprising an inner block, said ramp comprising an inclined surface between said inner block and said impact member.

* * * * *